United States Patent
Li et al.

(10) Patent No.: US 10,182,407 B2
(45) Date of Patent: Jan. 15, 2019

(54) POWER CONTROL METHOD AND USER EQUIPMENT IN A SYSTEM CONFIGURED WITH SERVING CELLS HAVING D2D SUB-FRAMES

(71) Applicant: Samsung Electronics Co., Ltd., Gyeonggi-do (KR)

(72) Inventors: Yingyang Li, Beijing (CN); Jingxing Fu, Beijing (CN)

(73) Assignee: Samsung Electronics Co., Ltd (KR)

( * ) Notice: Subject to any disclaimer, the term of this patent is extended or adjusted under 35 U.S.C. 154(b) by 156 days.

(21) Appl. No.: 15/127,300

(22) PCT Filed: Mar. 17, 2015

(86) PCT No.: PCT/KR2015/002586
§ 371 (c)(1),
(2) Date: Sep. 19, 2016

(87) PCT Pub. No.: WO2015/142037
PCT Pub. Date: Sep. 24, 2015

(65) Prior Publication Data
US 2018/0176871 A1    Jun. 21, 2018

(30) Foreign Application Priority Data

Mar. 18, 2014 (CN) .......................... 2014 1 0100520
Aug. 8, 2014 (CN) .......................... 2014 1 0389969
Sep. 5, 2014 (CN) .......................... 2014 1 0452793

(51) Int. Cl.
*H04W 52/38* (2009.01)
*H04W 52/14* (2009.01)
(Continued)

(52) U.S. Cl.
CPC ....... *H04W 52/383* (2013.01); *H04W 52/146* (2013.01); *H04W 52/281* (2013.01);
(Continued)

(58) Field of Classification Search
USPC .......................... 455/522, 69–70, 41.1–41.3
See application file for complete search history.

(56) References Cited

U.S. PATENT DOCUMENTS 9,763,199 B2 * 9/2017 Pelletier .............. H04W 52/146
2012/0163252 A1 6/2012 Ahn et al.
(Continued)

FOREIGN PATENT DOCUMENTS

CN          103079260          5/2013
CN          103596258          2/2014
(Continued)

OTHER PUBLICATIONS

PCT/ISA/210 Search Report issued on PCT/KR2015/002586 (pp. 4).
(Continued)

*Primary Examiner* — Fayyaz Alam
(74) *Attorney, Agent, or Firm* — The Farrell Law Firm, P.C.

(57) ABSTRACT

The present disclosure provides a power control method applicable to a system configured with serving cells having D2D sub-frames. The method includes: a user equipment (UE) calculates transmission power required by each of serving cells configured for the UE; the UE determines a signal or channel that is possible to be transmitted in each of the serving cells and allocates transmission power to the signal or channel according to conditions of the serving cells configured for the UE and a relation between the amount of total transmission power required by all of the serving cells configured for the UE and the amount of maximum transmission power configured in the UE; the UE transmits the signal or channel of a serving cell configured for the UE according to the transmission power allocated to the signals or channels. The present disclosure also provides an user equipment. According to the present disclosure, important (Continued)

signals or channels can have priority in power allocation. As such, performances of important signals and channels are firstly ensured.

21 Claims, 2 Drawing Sheets

(51) Int. Cl.
    *H04W 52/28*     (2009.01)
    *H04W 52/36*     (2009.01)
    *H04W 72/02*     (2009.01)
    *H04W 92/18*     (2009.01)

(52) U.S. Cl.
    CPC ......... *H04W 52/367* (2013.01); *H04W 72/02* (2013.01); *H04W 92/18* (2013.01)

(56) References Cited

U.S. PATENT DOCUMENTS

| | | |
|---|---|---|
| 2013/0109430 A1 | 5/2013 | Tseng et al. |
| 2013/0176953 A1 | 7/2013 | Stern-Berkowitz et al. |
| 2013/0178221 A1 | 7/2013 | Jung et al. |
| 2013/0324182 A1* | 12/2013 | Deng .................. H04W 52/281 455/522 |
| 2015/0031410 A1* | 1/2015 | Lim .................... H04W 52/146 455/522 |
| 2015/0163751 A1 | 6/2015 | Guo |
| 2017/0339645 A1* | 11/2017 | Jeong .................. H04W 52/243 |

FOREIGN PATENT DOCUMENTS

| | | |
|---|---|---|
| KR | 1020120074251 | 7/2012 |
| KR | 1020130048171 | 5/2013 |
| WO | WO 2013/108114 | 7/2013 |

OTHER PUBLICATIONS

PCT/ISA/237 Written Opinion issued on PCT/KR2015/002586 (pp. 6).

Chinese Office Action dated Nov. 1, 2018 issued in counterpart application No. 201410452793.0, 15 pages.

* cited by examiner

[Fig. 1]
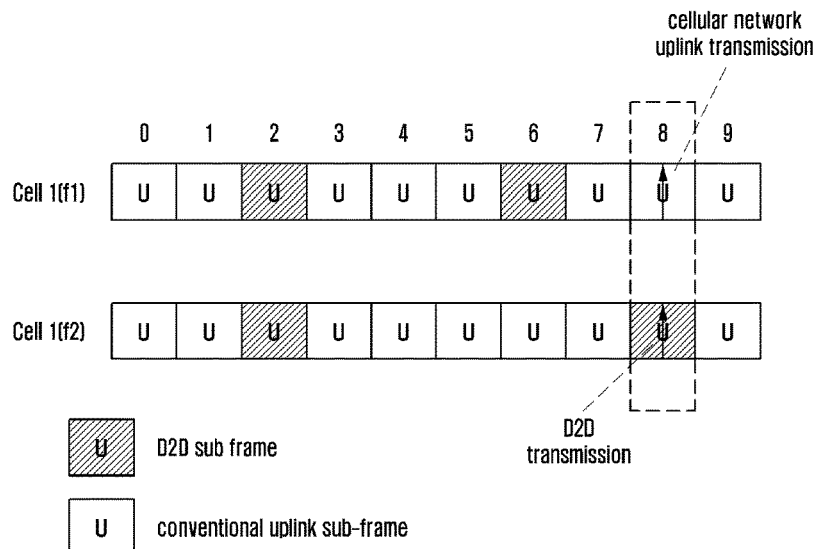
[Fig. 2]
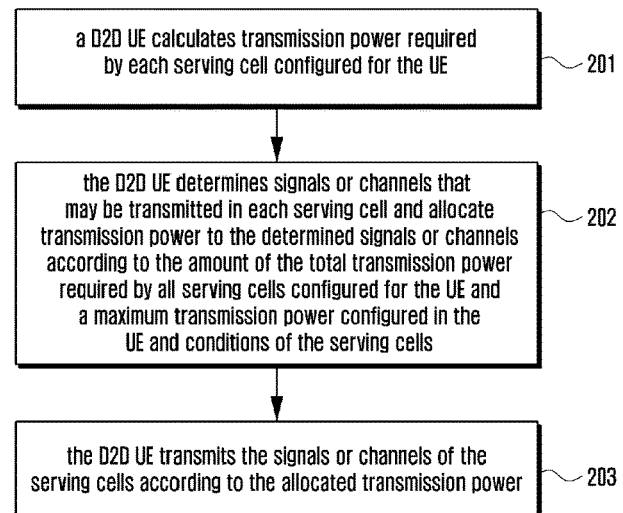
[Fig. 3]
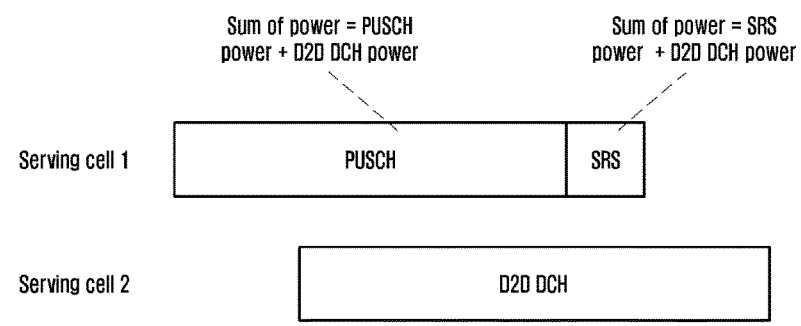

[Fig. 4]
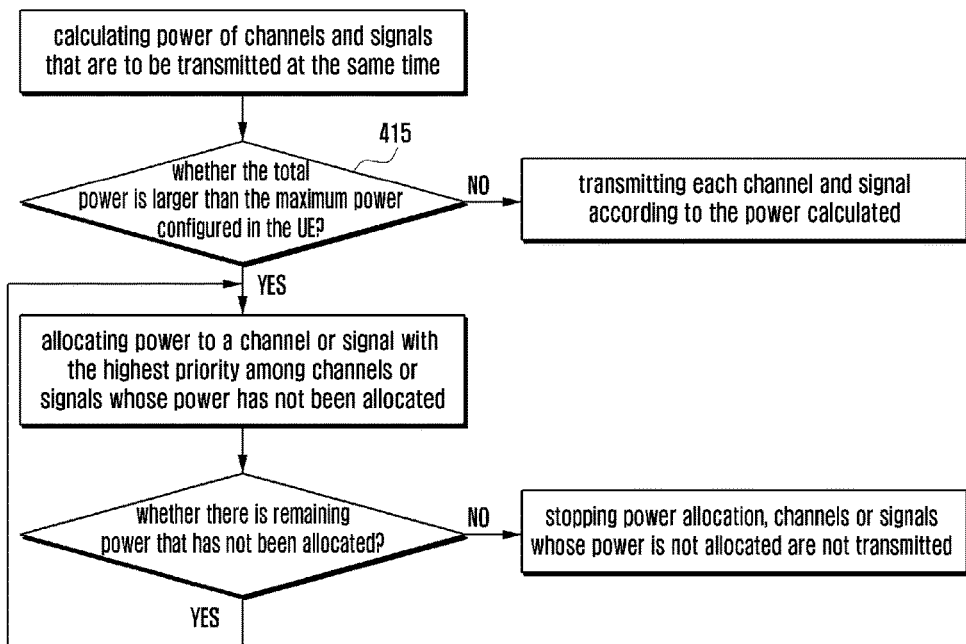
[Fig. 5]
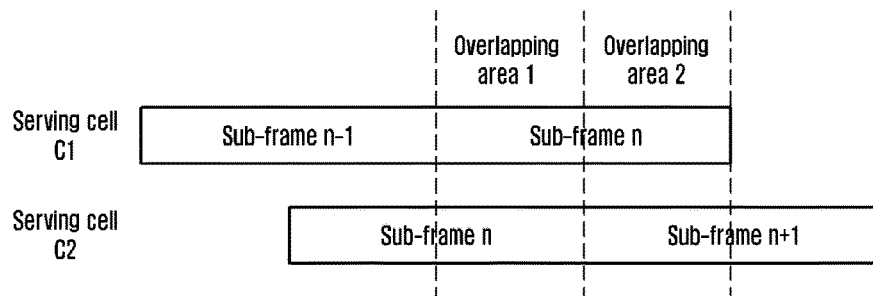
[Fig. 6]

POWER CONTROL METHOD AND USER EQUIPMENT IN A SYSTEM CONFIGURED WITH SERVING CELLS HAVING D2D SUB-FRAMES

PRIORITY

This application is a National Phase Entry of PCT International Application No. PCT/KR2015/002586 which was filed on Mar. 17, 2015, and claims priority to Chinese Patent Application No. 201410100520.X, which was filed on Mar. 18, 2014, Chinese Patent Application No. 201410389969.2, which was filed on Aug. 8, 2014, and Chinese Patent Application No. 201410452793.0, which was filed on Sep. 5, 2014, the contents of each of which are incorporated herein by reference.

TECHNICAL FIELD

The present disclosure relates to mobile communication technology, and particularly, to a power control method and user equipment of an LTE system when the LTE system is configured with serving cells having D2D sub-frames.

BACKGROUND ART

In conventional LTE (Long Term Evolution) systems, when a UE (user equipment) keeps in connection with a cellular network, the UE can at the same time send or receive D2D (Device-to-Device) signals or channels, or send or receive D2D signals or channels in different serving cells.

D2D communications in LTE coverage occupy uplink resources, i.e., occupying uplink carriers of FDD (frequency division duplexing) cells or uplink sub-frames of TDD (time division duplexing) cells. A UE may send a cellular network communication channel or signal in one or multiple serving cells within an uplink sub-frame and at the same time, send or receive D2D signals or channels in another one or multiple serving cells within the same uplink sub-frame, as shown in FIG. 1. FIG. 1 illustrates a situation where sub-frames of multiple serving cells align with each other. A problem, which also exists in situations where sub-frames of multiple serving cells do not align with each other, lies in that: in an overlapping area of different uplink sub-frames (the overlapping area may be the overlapping area of uplink sub-frame n and uplink sub-frame n+1, or the overlapping area of uplink sub-frame n and uplink sub-frame n−1), a UE may send a cellular network communication channel or signal in one or multiple serving cells within an uplink sub-frame and at the same time, send or receive D2D signals or channels in another one or multiple serving cells within the same uplink sub-frame. Channels or signals of cellular networks include: PUSCH (physical uplink shared channel), PUCCH (physical uplink control channel), PRACH (physical random access channel), and SRS (sounding reference signal). Signals or channels of D2D services include SS (synchronization signal), DS (discovery signal), CCH (control channel) and DCH (data channel), and the like. Among the above signals or channels, D2D SS may include one or multiple of PD2DSS (primary D2D SS), SD2DSS (secondary D2D SS), and PD2DSCH (physical D2D synchronization channel). D2D DS may include D2D discovery signal sequences and D2D discovery signal messages.

D2D UEs may have different service requirements. For example, service requirements may include PS (public safety) requirements or N-PS (non-public safety) requirements. Different service requirements have different levels of importance.

D2D communications are divided into broadcast, groupcast and unicast according to different propagation manners. Broadcast refers to a manner where one UE sends information and all other UEs can receive the information. Groupcast refers to a manner where one UE sends information and all UEs in a group can receive the information. Unicast refers to a manner where one UE sends information and another UE receives the information.

DISCLOSURE OF INVENTION

Technical Problem

Since a UE may send cellular network communication channels or signals and D2D signals or channels at the same time in different serving cells in the same uplink sub-frame or in an overlapping area of different uplink sub-frames, the sum of transmission power required by the cellular network communication channels or signals and transmission power required by the D2D signals or channels to be sent in different serving cells at the same time may be larger than the maximum transmission power configured in the UE. In addition, a new situation which has not been appeared before is that cellular network communication signals or channels and D2D signals or channels of multiple serving cells are transmitted at the same time in one uplink sub-frame or in an overlapping area of different uplink sub-frames while different D2D services have different service requirements. It is a yet-to-be solved problem that how to handle the allocation of transmission power to different services.

Solution to Problem

The present disclosure provides a power control method and a user equipment in a system configured with serving cells having D2D sub-frames to address at least one of the problems analyzed above, so that when D2D services and cellular network services co-exist, transmission power of a UE remains equal to or smaller than the maximum transmission power configured in the UE. Further, the UE is enabled to give preference to important services when allocating power.

The present disclosure provides a power control method, applicable to a system configured with serving cells having D2D sub-frames. The method may include:

A, calculating, by a UE, transmission power required by each of serving cells configured for the UE;

B, determining, by the UE, a channel or a signal that is possible to be transmitted in each of the serving cells and allocating transmission power for the channel or signal according to conditions of the serving cells configured for the UE and a relation between the amount of total transmission power required by all of the serving cells configured for the UE and the amount of maximum transmission power configured for the UE;

C, transmitting, by the UE, the channel or signal of a serving cell according to the transmission power allocated to the channel or signal.

In an example, the total transmission power required by all of the serving cells configured for the UE is the sum of transmission power required by channels or signals in an overlapping area in serving cells which overlap with each other.

In an example, the step B may include:

allocating transmission power required by a channel or signal of each serving cell in the overlapping area according to a calculation result of the step A if the sum of transmission power required by channels or signals in the overlapping area is smaller than or equal to the maximum transmission power configured in the UE.

In an example, the step B may include:

allocating transmission power required by two channels or signals that can be transmitted at the same time in the overlapping area according to a calculation result of the step A if the sum of transmission power required by channels or signals in the overlapping area is smaller than or equal to the maximum transmission power configured in the UE; allocating transmission power required by a channel or signal with high priority in channels or signals that cannot be transmitted at the same time according according to a calculation result of the step A, allocating no transmission power to a channel or signal with low priority in the channels or signals that cannot be transmitted at the same time; wherein the priority is a priority for allocating transmission power.

In an example, no transmission power is allocated to a channel or signal with low priority in a sub-frame in the overlapping area if sub-frames of the serving cells are not aligned to each other and the channels or signals of the sub-frames cannot be transmitted at the same time.

In an example, whether two channels or signals can be transmitted at the same time may be determined using the method in Table 1.

overlapping area according to a priority of the channel or signal of each of the serving cells if sub-frames of the serving cells are not aligned to each other; or transmission power is allocated to a channel or signal in a sub-frame corresponding to the overlapping area according to a priority of the channel or signal of each of the serving cells.

In an example, a sequence of signals and channels sorted in a descending order of the priorities for allocating transmission power is one of:

channels and signals of PS services, channels and signals of cellular network communication services, channels and signals of N-PS services;

channels and signals of cellular network communication services, channels and signals of PS services, channels and signals of N-PS services;

channels and signals of PS services, SS of N-PS services, DS of N-PS services, channels and signals of cellular network communication services, CCH of N-PS services, DCH of N-PS services;

SS of D2D services, DS of D2D services, channels and signals of cellular network communication services, CCH of D2D services, DCH of D2D services;

SS of D2D services, DS of D2D services, CCH of PS services, DCH of PS services, channels and signals of cellular network communication services, CCH of N-PS services, DCH of N-PS services;

SS of D2D services, CCH of PS services, DCH of PS services, channels and signals of cellular network communication services, DS of D2D services, CCH of N-PS services, DCH of N-PS services;

TABLE 1

|  | PUCCH | PUSCH | PRACH | SRS | SS | DS | PS CCH | PS DCH | N-PS CCH | N-PS DCH |
|---|---|---|---|---|---|---|---|---|---|---|
| PUCCH | Y/N/C | | | | | | | | | |
| PUSCH | Y/N/C | Y | | | | | | | | |
| PRACH | Y/N/C | Y/N/C | Y/N/C | | | | | | | |
| SRS | Y/N/C | Y/N/C | Y/N/C | Y/N/C | | | | | | |
| SS | Y/N/C | Y/N/C | Y/N/C | Y/N/C | Y/N/C | | | | | |
| DS | Y/N/C | Y/N/C | Y/N/C | Y/N/C | Y/N/C | Y/N/C | | | | |
| PS CCH | Y/N/C | Y/N/C | Y/N/C | Y/N/C | Y/N/C | Y/N/C | Y/N/C | | | |
| PS DCH | Y/N/C | Y/N/C | Y/N/C | Y/N/C | Y/N/C | Y/N/C | Y/N/C | Y | | |
| N-PS CCH | Y/N/C | Y/N/C | Y/N/C | Y/N/C | Y/N/C | Y/N/C | Y/N/C | Y/N/C | Y/N/C | |
| N-PS DCH | Y/N/C | Y/N/C | Y/N/C | Y/N/C | Y/N/C | Y/N/C | Y/N/C | Y/N/C | Y/N/C | Y |

The "Y" in Table 1 indicates two channels corresponding to the "Y" can be transmitted at the same time, the "N" in Table 1 indicates two channels corresponding to the "N" cannot be transmitted at the same time, the "C" in Table 1 indicates whether two channels corresponding to the "C" cannot be transmitted at the same time is configured by higher layer signaling, and the "Y/N/C" indicates 3 methods can be applicable to two channels corresponding to a column and a row where the "Y/N/C" is located.

In an example, the step B may include:

allocating transmission power to channels or signals of each of the serving cells in the overlapping area according to priorities of the channels or signals if the sum of transmission power of the signals or channels in the overlapping area is larger than the maximum transmission power configured in the UE, wherein the priorities are priorities for allocating transmission power.

In an example, transmission power is allocated only to a channel or a signal in a sub-frame corresponding to the SS of D2D services, DS of D2D services, channels and signals of cellular network communication services, CCH of PS services, DCH of PS services, CCH of N-PS services, DCH of N-PS services;

SS of D2D services, channels and signals of cellular network communication services, CCH of PS services, DCH of PS services, DS of D2D services, CCH of N-PS services, DCH of N-PS services;

channels and signals of cellular network communication services, SS of D2D services, DS of D2D services, CCH of PS services, DCH of PS services, CCH of N-PS services, DCH of N-PS services;

channels and signals of cellular network communication services, SS of D2D services, CCH of PS services, DCH of PS services, DS of D2D services, CCH of N-PS services, DCH of N-PS services;

channels and signals of cellular network communication services, SS of D2D services, DS of D2D services, CCH of broadcast services, DCH of broadcast services, CCH of multicast services, DCH of multicast services, CCH of unicast services, DCH of unicast services;

SS of D2D services, DS of D2D services, channels and signals of cellular network communication services, DCH of broadcast services, CCH of broadcast services, DCH of multicast services, CCH of multicast services, CCH of unicast services, DCH of unicast services;

SS of D2D services, DS of D2D services, CCH of broadcast services, DCH of broadcast services, CCH of multicast services, DCH of multicast services, channels and signals of cellular network communication services, CCH of unicast services, DCH of unicast services;

channels and signals of cellular network communication services, SS of D2D services, CCH of broadcast services, DCH of broadcast services, CCH of multicast services, DCH of multicast services, DS of D2D services, CCH of unicast services, DCH of unicast services;

SS of D2D services, channels and signals of cellular network communication services, CCH of broadcast services, DCH of broadcast services, CCH of multicast services, DCH of multicast services, DS of D2D services, CCH of unicast services, DCH of unicast services;

SS of D2D services, CCH of broadcast services, DCH of broadcast services, CCH of multicast services, DCH of multicast services, channels and signals of cellular network communication services, DS of D2D services, CCH of unicast services, DCH of unicast services;

channels and signals of cellular network communication services, channels and signals of D2D services.

In an example, signals and channels of PS services and N-PS services sorted in a descending order of priorities for allocating transmission power are: SS, DS, CCH, DCH of one D2D service;

signals and channels of cellular network communication services sorted in a descending order of priorities for allocating transmission power are: PRACH, PUCCH, PUSCH with UCI, PUSCH without UCI, SRS.

In an example, signals and channels sorted in a descending order of priorities for allocating transmission power are:

the priority of D2D services is the same with the priority of PUSCH without UCI of cellular network communication services, wherein channels or signals of D2D services include: D2D SS, D2D DS and D2D communication signals.

In an example, the procedure of allocating transmission power to channels or signals of each serving cell according to priorities for allocating transmission power to the channels or signals may include:

allocating transmission power according to the descending order of the priorities, wherein transmission power is first allocated to a channel or signal having a high priority, remaining transmission power after allocation to the channel or signal having the highest priority is allocated to channels or signals having lower priorities than the highest priority; if the remaining transmission power is less than transmission power required by one or multiple channels or signals having a lower priority than the highest priority, the transmission power required by the one or multiple channels or signals having the lower priority is reduced proportionally until the sum of all of allocated transmission power is smaller than or equal to the maximum transmission power configured in the UE;

wherein the proportionally reducing the transmission power required by the one or multiple channels or signals having the lower priority comprises:

for sub-frame i, proportionally adjusting, by the UE, transmission power of PUSCH without UCI and channels or signals of D2D services in serving cell c that have the same priority until the following condition is met:

$$\sum_{c \neq j, c \neq c1} \left( w(i) \cdot \hat{P}_{PUSCH,c}(i) \right) + w(i) \cdot \hat{P}_{D2D,c1}(i) \leq$$

$$\left( \hat{P}_{CMAX}(i) - \hat{P}_{PUCCH}(i) - \hat{P}_{PUSCH,j}(i) \right)$$

wherein $\hat{P}_{CMAX}(i)$ the is a linear value of the maximum transmission power $P_{CMAX}$ configured in the UE for sub-frame i;

$\hat{P}_{PUCCH}(i)$ is a linear value of the power of PUCCH $P_{PUCCH}(i)$;

$\hat{P}_{PUSCH,j}(i)$ is a linear value of the power of PUSCH with UCI $P_{PUSCH,j}(i)$ in serving cell j;

$\hat{P}_{PUSCH,c}(i)$ is a linear value of the power of PUSCH without UCI $P_{PUSCH,c}(i)$ in serving cell c;

w(i) is a power adjustment factor, and $0 \leq w(i) \leq 1$; and $\hat{P}_{D2D,c1}(i)$ is a linear value of power of channels or signals of D2D services $P_{D2D,c1}(i)$ in serving cell c1.

In an example, signals and channels sorted in a descending order of priorities for allocating transmission power are:

the priority of D2D DS and D2D communication signals is the same with the priority of PUSCH without UCI of cellular network communication services, the priority of D2D SS is higher than the priority of PUSCH without UCI of cellular network communication services, the priority of D2D SS is lower than the priority of PUSCH with UCI of cellular network communication services.

In an example, the procedure of allocating transmission power to channels or signals of each serving cell according to priorities for allocating transmission power to the channels or signals may include:

allocating transmission power according to the descending order of the priorities, wherein transmission power is first allocated to a channel or signal having a high priority, remaining transmission power after allocation to the channel or signal having the highest priority is allocated to channels or signals having lower priorities than the highest priority; if the remaining transmission power is less than transmission power required by one or multiple channels or signals having a lower priority than the highest priority, the transmission power required by the one or multiple channels or signals having the lower priority is reduced proportionally until the sum of all of allocated transmission power is smaller than or equal to the maximum transmission power configured in the UE;

wherein the proportionally reducing the transmission power required by the one or multiple channels or signals having the lower priority comprises:

for sub-frame i, allocating transmission power to D2D SS according to $\hat{P}_{D2DSS}(i) = \mathrm{Min}((\hat{P}_{CMAX}(i) - \hat{P}_{PUCCH}(i) - \hat{P}_{PUSCH,j}(i)), \hat{P}_{D2DSS}(i))$, and proportionally adjusting, by the UE, transmission power of PUSCH without UCI and D2D DS and D2D communication signals in serving cell c that have the same priority until the following condition is met:

$$\sum_{c \neq j, c \neq c1} \left( w(i) \cdot \hat{P}_{PUSCH,c}(i) \right) + w(i) \cdot \hat{P}_{D2D,c1}(i) \leq$$

$$\left( \hat{P}_{CMAX}(i) - \hat{P}_{PUCCH}(i) - \hat{P}_{PUSCH,j}(i) - \hat{P}_{D2DSS}(i) \right)$$

wherein the $\hat{P}_{CMAX}(i)$ is a linear value of the maximum transmission power $P_{CMAX}$ configured in the UE for sub-frame i;

$\hat{P}_{PUCCH}(i)$ is a linear value of the power of PUCCH $P_{PUCCH}(i)$ in serving cell c;

$\hat{P}_{PUSCH,j}(i)$ is a linear value of the power of PUSCH with UCI $P_{PUSCH,j}(i)$ in serving cell j;

$\hat{P}_{D2DSS}(i)$ is a linear value of the power of D2D SS $P_{D2DSS}(i)$;

$\hat{P}_{PUSCH,c}(i)$ is a linear value of the power of PUSCH without UCI $P_{PUSCH,c}(i)$ in serving cell c;

w(i) is a power adjustment factor, and 0≤w(i)≤1; and $\hat{P}_{D2D,c1}(i)$ is a linear value of power of D2D DS and D2D communication channels $P_{D2D,c1}(i)$ in serving cell c1.

In an example, the procedure of allocating transmission power to channels or signals of each serving cell according to priorities for allocating transmission power to the channels or signals may include:

allocating transmission power to signals and channels in a descending order of the priorities for allocating transmission power to the signals and channels, wherein transmission power is first allocated to a channel or a signal having the highest priority, the remaining transmission power is allocated to a channel or a signal having a lower priority than the highest priority after transmission power has been allocated to the channel or signal having highest priority, the process is repeated until all the transmission power has been allocated.

Preferably, the method further includes the steps of:

allocating no power to a channel or signal having a first priority if there is no remaining power after transmission power is allocated to a channel or signal having a higher priority than the first priority;

allocating transmission power to one or multiple channels or signals having a third priority according to one of the following manners if the remaining power is less than transmission power required by the one or multiple channels or signals after transmission power is allocated to a signal or channel having a higher priority than the third priority:

proportionally reducing the transmission power of each of the one or multiple channels or signals that have the third priority until the sum of all of allocated transmission power is smaller than or equal to the maximum transmission power configured in the UE; or allocating transmission power required by at least one channel or signal of the one or multiple channels or signals, and allocating no transmission power to other signals or channels of the one or multiple channels until the sum of all of allocated transmission power is smaller than or equal to the maximum transmission power configured in the UE; or proportionally reducing the transmission power of at least one of the one or multiple channels or signals that have the third priority until the sum of all of allocated transmission power is smaller than or equal to the maximum transmission power configured in the UE.

In an example, proportionally reducing the transmission power of one or multiple of the channels or signals having the third priority may include:

proportionally reducing transmission power of a service channel for transmitting data among the one or multiple channels or signals;

proportionally reducing transmission power of a control channel for transmitting control signaling among the one or multiple channels or signals, or transmitting at least one of the one or multiple channels or signals while stopping transmitting the other of the one or multiple channels or signals;

transmitting at least one of reference signals among the one or multiple channels or signals while stopping transmitting the other reference signals.

In an example, the procedure of proportionally reducing the transmission power required by the one or multiple channels or signals having the lower priority may include:

in a sub-frame i, when the sum of transmission power required by channels or signals of all of serving cells configured for the UE is larger than the maximum transmission power configured in the UE, proportionally adjusting transmission power of channels or signals that have the same priority in serving cell c until the following condition is met:

$$\sum_c \sum_l (w_{c,l}(i) \cdot \hat{P}_{c,l}(i)) \leq (\hat{P}_{CMAX}(i) - P_{allocated})$$

wherein the $\hat{P}_{CMAX}(i)$ is a linear value of the maximum transmission power $P_{CMAX}$ configured in the UE for sub-frame i;

$\hat{P}_{c,l}(i)$ is a linear value of power of a channel or signal l in serving cell c;

$w_{c,l}(i)$ is a power adjustment factor of the power of the channel or signal l in serving cell c, and $0 \leq w_{c,l}(i) \leq 1$;

$P_{allocated}$ is the power that has been allocated to channels or signals with priorities higher than the third priority;

$(\hat{P}_{CMAX}(i) - P_{allocated})$ is the remaining power after the power has been allocated to the channels or signals with priorities higher than the third priority.

In an example, the procedure of allocating transmission power to channels or signals of each serving cell according to priorities for allocating transmission power to the channels or signals may include:

proportionally reducing transmission power of all channels or signals until the sum of all of allocated transmission power is smaller than or equal to the maximum transmission power configured in the UE;

in a sub-frame i, when the sum of transmission power required by channels or signals of all of the serving cells configured for the UE is larger than the maximum transmission power configured in the UE, proportionally adjusting, by the UE, transmission power of all of the channels or signals in a serving cell c until the following condition is met:

$$\Sigma\Sigma(w_{c,l}(i) \cdot \hat{P}_{c,l}(i)) \leq (\hat{P}_{CMAX}(i))$$

wherein the $\hat{P}_{CMAX}(i)$ is a linear value of the maximum transmission power $P_{CMAX}$ configured in the UE for sub-frame i;

$\hat{P}_{c,l}(i)$ is a linear value of power of a channel or signal l in serving cell c;

$w_{c,l}(i)$ is a power adjustment factor of the power of the channel or signal l in serving cell c, $0 \leq w_{c,l}(i) \leq 1$, and channels or signals having different priorities correspond to different $w_{c,l}(i)$.

In an example, the step B may include: adjusting transmission power of a channel or signal according to one of Tables 2-7 when the sum of transmission power required by channels or signals of all of the serving cells configured for the UE is larger than the maximum transmission power configured in the UE:

TABLE 2

|  | SS | DS | CCH | DCH |
|---|---|---|---|---|
| PUCCH | 2, 3, 4 | 2, 3, 4 | 1, 2, 3, 4 | 1, 2, 4 |
| PUSCH | 2, 3 | 2, 3 | 1, 2, 3 | 1, 2 |
| PRACH | 3, 4 | 3, 4 | 1, 3, 4 | 1, 4 |
| SRS | 3, 4 | 3, 4 | 1, 3, 4 | 1, 4 |

TABLE 3

|  | SS | DS | PS CCH | PS DCH | PS CCH | PS DCH |
|---|---|---|---|---|---|---|
| PUCCH | 2, 3, 4 | 2, 3, 4 | 1, 2, 3, 4 | 1, 2, 4 | 1, 2, 3, 4 | 1, 2, 4 |
| PUSCH | 2, 3 | 2, 3 | 1, 2, 3 | 1, 2 | 1, 2, 3 | 1, 2 |
| PRACH | 3, 4 | 3, 4 | 1, 3, 4 | 1, 4 | 1, 3, 4 | 1, 4 |
| SRS | 3, 4 | 3, 4 | 1, 3, 4 | 1, 4 | 1, 3, 4 | 1, 4 |

TABLE 4

|  | PS SS | PS DS | N-PS SS | N-PS DS | PS CCH | PS DCH | PS CCH | PS DCH |
|---|---|---|---|---|---|---|---|---|
| PUCCH | 2, 3, 4 | 2, 3, 4 | 2, 3, 4 | 2, 3, 4 | 1, 2, 3, 4 | 1, 2, 4 | 1, 2, 3, 4 | 1, 2, 4 |
| PUSCH | 2, 3 | 2, 3 | 2, 3 | 2, 3 | 1, 2, 3 | 1, 2 | 1, 2, 3 | 1, 2 |
| PRACH | 3, 4 | 3, 4 | 3, 4 | 3, 4 | 1, 3, 4 | 1, 4 | 1, 3, 4 | 1, 4 |
| SRS | 3, 4 | 3, 4 | 3, 4 | 3, 4 | 1, 3, 4 | 1, 4 | 1, 3, 4 | 1, 4 |

TABLE 5

|  | SS | DS | Broadcast CCH | Broadcast DCH | Groupcast CCH | Groupcast DCH | Unicast CCH | Unicast DCH |
|---|---|---|---|---|---|---|---|---|
| PUCCH | 2, 3, 4 | 2, 3, 4 | 1, 2, 3, 4 | 1, 2, 4 | 1, 2, 3, 4 | 1, 2, 4 | 1, 2, 3, 4 | 1, 2, 4 |
| PUSCH | 2, 3 | 2, 3 | 1, 2, 3 | 1, 2 | 1, 2, 3 | 1, 2 | 1, 2, 3 | 1, 2 |
| PRACH | 3, 4 | 3, 4 | 1, 3, 4 | 1, 4 | 1, 3, 4 | 1, 4 | 1, 3, 4 | 1, 4 |
| SRS | 3, 4 | 3, 4 | 1, 3, 4 | 1, 4 | 1, 3, 4 | 1, 4 | 1, 3, 4 | 1, 4 |

TABLE 6

|  | SS | DS | PS CCH | PS DCH | N-PS CCH | N-PS DCH |
|---|---|---|---|---|---|---|
| SS | 3, 4 |  |  |  |  |  |
| DS | 3, 4 | 3, 4 |  |  |  |  |
| PS CCH | 2, 3, 4 | 2, 3, 4 | 1, 2, 3, 4 |  |  |  |
| PS DCH | 2, 3 | 2, 3 | 1, 2, 3 | 1, 2 |  |  |
| N-PS CCH | 2, 3, 4 | 2, 3, 4 | 1, 2, 3, 4 | 1, 2, 4 | 1, 2, 3, 4 |  |
| N-PS DCH | 2, 3 | 2, 3 | 1, 2, 3 | 1, 2 | 1, 2, 3 | 1, 2 |

TABLE 7

|  | SS | DS | Broadcast CCH | Broadcast DCH | Groupcast CCH | Groupcast DCH | Unicast CCH | Unicast DCH |
|---|---|---|---|---|---|---|---|---|
| SS | 3, 4 |  |  |  |  |  |  |  |
| DS | 3, 4 | 3, 4 |  |  |  |  |  |  |
| Broadcast CCH | 2, 3, 4 | 2, 3, 4 | 1, 2, 3, 4 |  |  |  |  |  |
| Broadcast DCH | 2, 3 | 2, 3 | 1, 2, 3 | 1, 2 |  |  |  |  |
| Groupcast CCH | 2, 3, 4 | 2, 3, 4 | 1, 2, 3, 4 | 1, 2, 4 | 1, 2, 3, 4 |  |  |  |
| Groupcast DCH | 2, 3 | 2, 3 | 1, 2, 3 | 1, 2 | 1, 2, 3 | 1, 2 |  |  |
| Unicast CCH | 2, 3, 4 | 2, 3, 4 | 1, 2, 3, 4 | 1, 2, 4 | 1, 2, 3, 4 | 1, 2, 4 | 1, 2, 3, 4 |  |
| Unicast DCH | 2, 3 | 2, 3 | 1, 2, 3 | 1, 2 | 1, 2, 3 | 1, 2 | 1, 2, 3 | 1, 2 | wherein, "1" indicates adjusting transmission power of a channel or signal in a column where "1" is located until the total transmission power of an overlapping area is smaller than or equal to $P_{CMAX}$;

"2" indicates adjusting transmission power of a channel or signal in a column where "2" is located until the total transmission power of an overlapping area is smaller than or equal to $P_{CMAX}$;

"3" indicates stopping transmission of a channel or signal in a column where "3" is located;

"4" indicates stopping transmission of a channel or signal in a row where "4" is located; and "1,2,3" indicates two channels or signals corresponding to a row and a column where "1,2,3" is located can adopt a method corresponding to one of "1", "2" and "3".

The present disclosure also provides a user equipment (UE) for power control in a system configured with a serving cell having D2D sub-frames, comprising: a power calculating module, a power allocating module and a transmitting module;

the power calculating module is configured to calculate transmission power required by each of serving cells configured for the UE respectively;

the power allocating module is configured to determine a channel or a signal that is possible to be transmitted in each of the serving cells and allocate transmission power for each channel or signal determined according to the amount of the total transmission power required by all of the serving cells and the amount of maximum transmission power configured in the UE and the condition of the configured serving cells; and the transmitting module is configured to transmit the channel or signal of each serving cell according to the allocated transmission power.

Advantageous Effects of Invention

According to the above technical mechanism, the power control method and user equipment in an LTE system configured with serving cells having D2D sub-frames enables a UE allocate transmission power according to priorities while keeping the total transmission power within the maximum transmission power configured in the UE so as to give preference to important channels or signals when allocating power when D2D services and cellular network services co-exist. As such, performances of important signals or channels are ensured.

BRIEF DESCRIPTION OF DRAWINGS

FIG. 1 is a schematic diagram illustrating a D2D communication network;

FIG. 2 is the flowchart illustrating a process in accordance with the present disclosure;

FIG. 3 is a schematic diagram illustrating the sum of transmission power required by channels or signals of all serving cells;

FIG. 4 is a flowchart illustrating a process of allocating transmission power according to priorities in accordance with the present disclosure;

FIG. 5 is a schematic diagram illustrating overlapping sub-frames when sub-frames of multiple serving cells do not align to each other in accordance with embodiment 8 of the present disclosure;

FIG. 6 is a schematic diagram illustrating modules of a user equipment in accordance with an embodiment of the present disclosure.

MODE FOR THE INVENTION

The present invention is hereinafter further described in detail with reference to the accompanying drawings as well as embodiments so as to make the objective, technical solution and merits thereof more apparent.

For a UE that is configured with serving cells having D2D sub-frames, it is assumed in the present disclosure that there is at least one a serving cell having D2D sub-frames in plural serving cells configured for the UE.

Different D2D communication services may have different service requirements and may be of different importance. For example, service requirements of PS services may have greater importance than service requirements of N-PS services. The importance of cellular network channels or signals is also different from the importance of D2D channels or signals. In addition, different channels or signals of the same service may have different importance. For example, the importance of PUCCH channel in a cellular network is greater than the importance of PUSCH channel in the cellular network, while the importance of D2D SS is greater than the importance of D2D DCH. In the present disclosure, the power allocation priority of a channel or a signal is determined according to the importance of the service and the importance of the channel or the signal, and transmission power is allocated to the channel or signal according to the power allocation priority.

The power allocation priority of a channel or a signal and a detailed method of allocating power to the channel or the signal of D2D services and cellular network communication services will be described in detail hereafter.

A power control method and a user equipment applicable in a system configured with serving cells having D2D sub-frames are provided according to embodiments of the present disclosure. As shown in FIG. 2, the method may include the following procedures.

At block 201, a D2D UE calculates transmission power required by each configured serving cell respectively.

The transmission power required by channels or signals of each serving cell configured in the system may be calculated according to a method defined for the serving cell, which will not be restricted herein. For example, the transmission power of a channel or a signal of the cellular network is calculated according to the calculation methods defined in conventional 3GPP Release 11 protocols. The power of a D2D synchronization channel is configured by high-level signaling or is determined according to a protocol.

At block 202, the D2D UE determines a channel or a signal that may be transmitted in each serving cell and allocates transmission power for each serving cell according to conditions of the configured serving cells and the amount of total transmission power required by all the serving cells and the amount of maximum transmission power of the UE.

The D2D UE determines whether each serving cell is actually used for uplink transmission and determines the transmission power of the serving cell.

The serving cells configured in the system may include two or plural serving cells, and at least one of the serving cells is configured with D2D sub-frames.

The D2D UE refers to that the UE is configured with at least one serving cell having D2D sub-frames. All of UEs mentioned hereafter in the disclosure refer to D2D UEs and are simply referred to as UEs for short.

At block 203, the UE transmits a channel or signal of a serving cell according to the transmission power allocated to the serving cell.

The total transmission power required by channels and signals of all the serving cells refers to the sum of transmission power that is needed for transmitting channels or signals of the serving cells that are overlapping at that time. For example, as shown in FIG. 3, during PUSCH transmission time, a PUSCH of serving cell 1 is overlapping with a D2D DCH of serving cell 2, and the total transmission power during the transmission time is the sum of the power of the PUSCH of serving cell 1 and the power of the D2D DCH of serving cell 2. During SRS transmission time in one sub-frame, a SRS in serving cell 1 overlaps with a D2D DCH of serving cell 2, and the total transmission power during the transmission time is the sum of the power of the SRS in serving cell 1 and the power of the D2D DCH of serving cell 2.

In the following, the method for determining the transmission power of a channel or a signal is specifically described according to different situations of the UE.

Embodiment 1

Situation 1:

When the total transmission power required by the channels or signals of all the serving cells configured for the UE is smaller than or equal to the maximum transmission power configured in the UE, there are several power methods as follows.

Method 1:

According to block 201, for each sub-frame, transmission power of channels or signals of each serving cell is calculated individually according to a pre-defined method, and channels or signals of each serving cell is transmitted according to the calculated transmission power respectively. As such, power requirements of the serving cells can be fully met while it is ensured the transmission power of the UE is smaller than the maximum transmission power configured in the UE.

Method 2:

According to block 201, for each sub-frame, the transmission power of channels or signals of each serving cell is calculated respectively according to a pre-defined method, and channels or signals having higher priorities are transmitted while channels or signals having lower priorities are not transmitted. Thus, transmission opportunities of channels or signals having different priorities are independent from transmission power, and are only related with other channels or signals that need to be transmitted at the same time. For example, at sub-frame n, a UE needs to transmit a PUCCH of a cellular network in a configured cell 1 and transmit a D2D DCH in a configured cell 2; since the priority of the PUCCH is higher than that of the D2D DCH, the UE only transmits the PUCCH channel at the sub-frame n but does not transmit the D2D DCH. As such, in the circumstance that the transmission power of the UE is smaller than the maximum transmission power configured in the UE, some channels will not be transmitted, and some data transmission opportunities will be wasted.

The method of determining the priority for allocating transmission power for the channels or signals of each serving cell may be the method described in Situation 2.

Whether two channels or signals can be transmitted at the same time may be determined using the method in Table 1. If the two channels or signals can be transmitted at the same time, they will be transmitted at the same time; if they can not be transmitted at the same time, it is then determined which of the two channels or signals is to be transmitted according to respective priorities. That is, the channel or signal having a higher priority will be transmitted, and the channel or signal having a lower priority will not be transmitted.

by high-level signaling. The "Y/N/C" indicates that there are 3 processing methods for the two channels or signals in the column and in the row. According to the first method, the two channels or signals can be transmitted at the same time; according to the second method, the two channels or signals can not be transmitted at the same time; and according to the third method, whether the two channels or signals can be transmitted at the same time is configured by high-level signaling.

Situation 2:

The total transmission power required by channels or signals of all serving cells configured for the UE is larger than the maximum transmission power configured in the UE.

According to block 201, in each sub-frame, when the total transmission power required by channels or signals of all the serving cells configured for the UE is larger than the maximum transmission power configured in the UE, the transmission power of each serving cell may be determined according to the following method.

The transmission power of channels or signals of each serving cell is allocated according to the priority of the channels or signals. The method for determining the priority of the signals and channels of D2D services and of cellular network services may be as follows.

Method 1:

A method for determining the transmission power of channels or signals of each serving cell of a D2D UE may include: determining a priority for allocating transmission power to a channel or signal of a serving cell (i.e., the priority is used in allocating transmission power) according to the importance of services of the serving cell. The services may include PS services, N-PS services, and cellular network communication services. When sorted according to priorities for allocating transmission power, the priorities of all signals and channels of the PS services are higher than the priorities of all signals and channels of cellular network communication services; and the priorities of all signal and channels of cellular network communication services are higher than the priorities of all signals and channels of the N-PS service. The signals and channels sorted in a descending order of priorities for allocating transmission power are: signals and channels of PS services, signals and channels of

TABLE 8

|  | PUCCH | PUSCH | PRACH | SRS | SS | DS | PS CCH | PS DCH | N-PS CCH | N-PS DCH |
|---|---|---|---|---|---|---|---|---|---|---|
| PUCCH | Y/N/C | | | | | | | | | |
| PUSCH | Y/N/C | Y | | | | | | | | |
| PRACH | Y/N/C | Y/N/C | Y/N/C | | | | | | | |
| SRS | Y/N/C | Y/N/C | Y/N/C | Y/N/C | | | | | | |
| SS | Y/N/C | Y/N/C | Y/N/C | Y/N/C | Y/N/C | | | | | |
| DS | Y/N/C | Y/N/C | Y/N/C | Y/N/C | Y/N/C | Y/N/C | | | | |
| PS CCH | Y/N/C | Y/N/C | Y/N/C | Y/N/C | Y/N/C | Y/N/C | Y/N/C | | | |
| PS DCH | Y/N/C | Y/N/C | Y/N/C | Y/N/C | Y/N/C | Y/N/C | Y/N/C | Y | | |
| N-PS CCH | Y/N/C | Y/N/C | Y/N/C | Y/N/C | Y/N/C | Y/N/C | Y/N/C | Y/N/C | Y/N/C | |
| N-PS DCH | Y/N/C | Y/N/C | Y/N/C | Y/N/C | Y/N/C | Y/N/C | Y/N/C | Y/N/C | Y/N/C | Y |

In table 8, "Y" indicates that the two channels or signals can be transmitted at the same time, "N" indicates that the two channels or signals cannot be transmitted at the same time, and "C" indicates that whether the two channels or signals can be transmitted at the same time can be configured cellular network communication services, and signals and channels of N-PS services. As such, it is ensured that PS services are given the highest priorities. Since cellular network communication is wide-area communication, and has a priority higher than that of N-PS services which is common local-area communication. When the priorities are determined in this way, the work load of the protocol is small.

Signals and channels of PS service and N-PS services are sorted according to the priorities for allocating transmission power. In one D2D service, the priority of a SS is higher than the priority of a DS, the priority of a DS is higher than the priority of a CCH, and the priority of a CCH is higher than the priority of a DCH. Since a channel is a synchronization signal transmitted by a UE, there may be multiple UEs that establish synchronization by using synchronization signals. Establishing synchronization is a premise for establishing other D2D communications, thus the priority of D2D SS is the highest among D2D channels and signals having the same service requirements. Discovery signals are used in certain position-based services, and are also the premise for one-to-one communication services between UEs, thus are also important. Therefore the priority of discovery signals is in the second place. Since CCH transports control signaling, the priority of CCH is higher than data channel DCH.

Signals and channels of cellular network communication services are sorted according to the priorities for allocating transmission power. The priority of a PRACH is higher than the priority of a PUCCH, the priority of a PUCCH is higher than the priority of a PUSCH with uplink control information (UCI), the priority of a PUSCH with UCI is higher than a PUSCH without UCI, and the priority of a PUSCH without UCI is higher than the priority of a SRS.

Method 2:

A method for determining the transmission power of channels and signals in each serving cell of a D2D UE may include: determining priorities for allocating transmission power to channels and signals of the serving cell according to the importance of services of the serving cell. The services may include PS services, N-PS services, and cellular network communication services. When sorted according to the priorities for allocating transmission power, the priorities of all signals and channels of cellular network communication services are higher than the priorities of all signals and channels of PS services; and the priorities of all signals and channels of PS services are higher than the priorities of all signals and channels of N-PS services. The services sorted in a descending order of priorities of allocating transmission power are: cellular network communication services, signals and channels of PS services, and signals and channels of N-PS services. Since cellar network communication is wide-area communication and has large coverage, the power allocation of cellar network communication services should be guaranteed first, and priority of channels or signals of cellar network communication services is higher than priorities of PS services and N-PS services which are local-area D2D communication. Priorities of PS services which are more importance are higher than priorities of N-PS services which are less important. When the priorities are determined in this way, the working load of the protocol is small.

For signals and channels of PS services and N-PS services, they are sorted according to the priorities for allocating transmission power. In one D2D service, the priority of a SS is higher than the priority of a DS, the priority of a DS is higher than the priority of a CCH, and the priority of a CCH is higher than the priority of a DCH. Since a channel is synchronization signal transmitted by a UE, multiple UEs may establish synchronization with each other using synchronization signals. Establishing synchronization is a premise for performing other D2D communications, thus the priority of SS is the highest among D2D channels and signals having the same service requirements. The discovery signal was at first used by UEs in certain location-based services. The discovery signal is also a premise for one-to-one communication between UEs, thus is also important. Therefore, the priority of discovery signal is in the second place. Since CCH transports control signaling, the priority of CCH is higher than data channel DCH.

Signals and channels in cellular network communication services are sorted according to priorities for allocating transmission power. The priority of PRACH is higher than the priority of PUCCH, the priority of PUCCH is higher than the priority of PUSCH with UCI, the priority of PUSCH with UCI is higher than PUSCH without UCI, and the priority of PUSCH without UCI is higher than the priority of SRS.

Method 3:

A method for determining transmission power of channels or signals of each serving cell of a D2D UE may determine priorities for allocating transmission power to channels or signals of a serving cell not entirely based on the importance of services of the serving cell. For PS services, N-PS services, and cellular network communication services, when sorted according to priorities for allocating transmission power, priorities of all signals and channels of PS services are higher than priorities of all signals and channels of cellular network communication services and priorities of all signals and channels of N-PS services; priorities of SS and DS of N-PS services are higher than the priorities of all signals and channels of cellular network communication services, and priorities of CCH and DCH of N-PS services are lower than the priorities of all the signals and channels of cellular network communication services. The signals and channels sorted in a descending order of priorities of allocating transmission power are: signals and channels of PS services, SS of N-PS services, DS of N-PS services, signals and channels of cellular network communication services, CCH of N-PS services, and DCH of N-PS services. Since PS services are important, power is first allocated to PS services. SS and DS of N-PS services are transmitted by one user and used by multiple users, thus are also given relatively high priorities. Since cellular network communication is wide-area communication and has large coverage, the priorities of channels or signals of cellular network communication services are higher than those of CCH and DCH of N-PS services. As such, the importance of services and the importance of channels are both taken into consideration.

When signals and channels of PS services and N-PS services are sorted according to the priorities for allocating transmission power, in one D2D service, the priority of SS is higher than the priority of DS, the priority of DS is higher than the priority of CCH, and the priority of CCH is higher than the priority of DCH. When signals and channels in cellular network communication services are sorted according to the priorities of allocating transmission power, the priority of PRACH is higher than the priority of PUCCH, the priority of PUCCH is higher than the priority of PUSCH with UCI, the priority of PUSCH with UCI is higher than the priority of PUSCH without UCI, and the priority of PUSCH without UCI is higher than the priority of SRS.

Method 4:

A method for determining transmission power of channels or signals of each serving cell of a D2D UE may determine priorities for allocating transmission power to channels or signals of a serving cell not entirely based on the importance of services of the serving cell. When D2D services and cellular network communication services are sorted according to priorities for allocating transmission power, priorities of SS and DS of D2D services are higher than priorities of all signals or channels of cellular network communication services, and priorities of all signals and channels of cellular network communication services are higher than those of CCH and DCH of D2D services. Signals and channels sorted in a descending order of the priorities for allocating transmission power are: SS of D2D services, DS of D2D services, signals and channels of cellular network communication services, CCH of D2D services, and DCH of D2D services. SS and DS of D2D services are transmitted by one user and used by multiple users, so power should be first allocated to D2D SS and DS. The cellular network communication is wide-area communication and has large coverage, so the priorities of channels or signals of cellular network communication services are higher than those of CCH and DCH of D2D services. As such, the importance of the services and the importance of channels are both taken into consideration.

When signals and channels of cellular network communication services are sorted according to priorities for allocating transmission power, the priority of PRACH is higher than the priority of PUCCH, the priority of PUCCH is higher than the priority of PUSCH with UCI, the priority of PUSCH with UCI is higher than the priority of PUSCH without UCI, and the priority of PUSCH without UCI is higher than the priority of SRS.

Method 5:

A method for determining transmission power of channels or signals of each serving cell of the D2D UE determine priorities for allocating transmission power to channels or signals of a serving cell not entirely based on the importance of services of the serving cell. When D2D services and cellular network communication services are sorted according to the priorities for allocating transmission power, the priorities of SS and DS of D2D services are higher than priorities of all signals or channels of cellular network communication services; the priorities of CCH and DCH of PS services are higher than priorities of all signals and channels of cellular network communication services; and the priorities of all signals and channels of cellular network communication services are higher than those of CCH and DCH of N-PS services. Signals and channels sorted in a descending order of the priorities for allocating transmission power are: SS of D2D services, DS of D2D services, CCH of PS services, DCH of PS services, signals and channels of cellular network communication services, CCH of N-PS services, and DCH of N-PS services.

When signals and channels of cellular network communication services are sorted according to the priorities for allocating transmission power, the priority of PRACH is higher than the priority of PUCCH, the priority of PUCCH is higher than the priority of PUSCH with UCI, the priority of PUSCH with UCI is higher than the priority of PUSCH without UCI, and the priority of PUSCH without UCI is higher than the priority of SRS.

Method 6:

A method for determining transmission power of channels or signals of each serving cell of the D2D UE determine priorities for allocating transmission power to channels or signals of a serving cell not entirely based on the importance of services of the serving cell. When signals and channels of D2D services and cellular network communication services are sorted according to the priorities for allocating transmission power, the priority of SS of D2D services is higher than the priorities of all signals or channels of cellular network communication services; the priorities of CCH and DCH of PS services are higher than the priorities of all signals and channels of cellular network communication services; the priorities of all signals and channels of cellular network communication services are higher than the priority of DS of D2D services, and the priority of DS of D2D services is higher than the priorities of CCH and DCH of N-PS services. Signals and channels sorted in a descending order of the priorities of allocating transmission power are: SS of D2D services, CCH of PS services, DCH of PS services, signals and channels of cellular network communication services, DS of D2D services, CCH of N-PS services, and DCH of N-PS services.

When signals and channels of cellular network communication services are sorted according to the priorities for allocating transmission power, the priority of PRACH is higher than the priority of PUCCH, the priority of PUCCH is higher than the priority of PUSCH with UCI, the priority of PUSCH with UCI is higher than the priority of PUSCH without UCI, and the priority of PUSCH without UCI is higher than the priority of SRS.

Method 7:

A method for determining transmission power of channels or signals of each serving cell of the D2D UE determines priorities for allocating transmission power to channels or signals of a serving cell not entirely based on the importance of services of the serving cell. When signals and channels of D2D services and cellular network communication services are sorted according to the priorities for allocating transmission power, the priorities of SS and DS of D2D services are higher than the priorities of all signals or channels of cellular network communication services; the priorities of all signals and channels of cellular network communication services are higher than the priorities of CCH and DCH of PS services; the priorities of CCH and DCH of PS services are higher than the priorities of CCH and DCH of N-PS services. Signals and channels sorted in a descending order of the priorities for allocating transmission power are: SS of D2D services, CCH of PS services, DCH of PS services, signals and channels of cellular network communication services, DS of D2D services, CCH of N-PS services, and DCH of N-PS services.

When signals and channels in cellular network communication services are sorted according to the priorities for allocating transmission power, the priority of PRACH is higher than the priority of PUCCH, the priority of PUCCH is higher than the priority of PUSCH with UCI, the priority of PUSCH with UCI is higher than the priority of PUSCH without UCI, and the priority of PUSCH without UCI is higher than the priority of SRS.

Method 8:

A method for determining transmission power of channels or signals of each serving cell of the D2D UE determines priorities for allocating transmission power to channels or signals of a serving cell not entirely based on the importance of services of the serving cell. When signals and channels of D2D services and cellular network communication services are sorted according to the priorities for allocating transmission power, the priority of SS of D2D services is higher than the priorities of all signals or channels of cellular network communication services; the priorities of all signals and channels of cellular network communication services are higher than the priorities of CCH and DCH of PS services; the priorities of CCH and DCH of PS services are higher than the priority of DS, and the priority of DS is higher than the priorities of CCH and DCH of N-PS services. Signals and channels sorted in a descending order of priorities for allocating transmission power are: SS of D2D services, signals and channels of cellular network communication services, CCH of PS services, DCH of PS services, DS of D2D services, CCH of N-PS services, and DCH of N-PS services.

When signals and channels of cellular network communication services are sorted according to priorities for allocating transmission power, the priority of PRACH is higher than the priority of PUCCH, the priority of PUCCH is higher than the priority of PUSCH with UCI, the priority of PUSCH with UCI is higher than the priority of PUSCH without UCI, and the priority of PUSCH without UCI is higher than the priority of SRS.

Method 9:

A method for determining transmission power of channels or signals of each serving cell of the D2D UE determines priorities for allocating transmission power allocation for channels or signals of a serving cell not entirely based on the importance of services of the serving cell. When signals and channels of D2D services and cellular network communication services are sorted according to the priorities for allocating transmission power, the priorities of all signals and channels of cellular network communication services are higher than priorities of SS and DS of D2D services; the priorities of SS and DS of D2D services are higher than the priorities of CCH and DCH of PS services; and the priorities of CCH and DCH of PS services are higher than the priorities of CCH and DCH of N-PS services. Thus, signals and channels sorted in a descending order of the priorities for allocating transmission power are: signals and channels of cellular network communication services, SS of D2D services, DS of D2D services, CCH of PS services, DCH of PS services, CCH of N-PS services, and DCH of N-PS services.

When signals and channels of cellular network communication services are sorted according to the priorities for allocating transmission power, the priority of PRACH is higher than the priority of PUCCH, the priority of PUCCH is higher than the priority of PUSCH with UCI, the priority of PUSCH with UCI is higher than the priority of PUSCH without UCI, and the priority of PUSCH without UCI is higher than the priority of SRS.

Method 10:

A method for determining transmission power of channels or signals of each serving cell of a D2D UE determines priorities for allocating transmission power for channels or signals of a serving cell not entirely based on the importance of services of the serving cell. When D2D services and cellular network communication services are sorted according to priorities for allocating transmission power, the priorities of all signals and channels of cellular network communication services are higher than the priority of SS of D2D services; the priority of SS of D2D services is higher than the priorities of CCH and DCH of PS services; the priorities of CCH and DCH of PS services are higher than the priority of DS, and the priority of DS is higher than the priorities of CCH and DCH of N-PS services. The channels and signals sorted in a descending order of the priorities for allocating transmission power are: signals and channels of cellular network communication services, SS of D2D services, CCH of PS services, DCH of PS services, DS of D2D services, CCH of N-PS services, and DCH of N-PS services.

When signals and channels of cellular network communication services are sorted according to the priorities for allocating transmission power, the priority of PRACH is higher than the priority of PUCCH, the priority of PUCCH is higher than the priority of PUSCH with UCI, the priority of PUSCH with UCI is higher than the priority of PUSCH without UCI, and the priority of PUSCH without UCI is higher than the priority of SRS.

Method 11:

A method for determining transmission power of channels or signals of each serving cell of a D2D UE determines the priorities for allocating transmission power to channels or signals of a serving cell not entirely based on the importance of services of the serving cell. When D2D services and cellular network communication services are sorted according to the priorities of the transmission power allocation, the priorities of all signals and channels of cellular network communication services are higher than the priorities of SS and DS of D2D services; the priority of DS of D2D services is higher than the priorities of broadcast CCH and DCH; the priorities of the broadcast CCH and DCH are higher than the priorities of groupcast CCH and DCH, and the priorities of groupcast CCH and DCH are higher than the priorities of unicast CCH and DCH. Signals and channels sorted in a descending order of the priorities for allocating transmission power are: signals and channels of cellular network communication services, SS of D2D services, DS of D2D services, broadcast CCH, broadcast DCH, groupcast CCH, groupcast DCH, unicast CCH, and unicast DCH.

Method 12:

A method for determining transmission power of channels or signals of each serving cell of the D2D UE determines the priorities for allocating transmission power for channels or signals of a serving cell not entirely based on the importance of services of the serving cell. When D2D services and cellular network communication services are sorted according to the priorities for allocating transmission power, the priorities of SS and DS of D2D services are higher than the priorities of all signals and channels of cellular network communication services; priorities of all signals and channels of cellular network communication services are higher than the priorities of broadcast CCH and DCH; the priorities of broadcast CCH and DCH are higher than the priorities of groupcast CCH and DCH, and the priorities of groupcast CCH and DCH are higher than the priorities of unicast CCH and DCH. Signals and channels sorted in a descending order of the priorities for allocating transmission power are: SS of D2D services, DS of D2D services, signals and channels of cellular network communication services, broadcast CCH, broadcast DCH, groupcast CCH, groupcast DCH, unicast CCH, and unicast DCH.

Method 13:

A method for determining transmission power of channels or signals of each serving cell of a D2D UE determines the priorities for allocating transmission power to channels or signals of a serving cell not entirely based on the importance of services of the serving cell. When D2D services and cellular network communication services are sorted according to the priorities for allocating transmission power, the priorities of SS and DS of D2D services are higher than the priorities of broadcast CCH and DCH; the priorities of broadcast CCH and DCH are higher than the priorities of groupcast CCH and DCH, and the priorities of groupcast CCH and DCH are higher than the priorities of all signals and channels of cellular network communication services; and the priorities of all signals and channels of cellular network communication services are higher than the priorities of unicast CCH and DCH. Signals and channels sorted in a descending order of the priorities for allocating transmission power are: SS of D2D services, DS of D2D services, broadcast CCH, broadcast DCH, groupcast CCH, groupcast DCH, signals and channels of cellular network communication services, unicast CCH, and unicast DCH.

Method 14:

A method for determining the transmission power of the channels or signals of each serving cell of a D2D UE determines the priorities for allocating transmission power to channels or signals of a serving cell not entirely based on the importance of services of the serving cell. When D2D services and cellular network communication services are sorted according to the priorities for allocating transmission power, the priorities of all signals and channels of cellular network communication services are higher than the priority of SS of D2D services; the priority of SS of D2D services is higher than the priorities of broadcast CCH and DCH; the priorities of broadcast CCH and DCH are higher than the priorities of groupcast CCH and DCH, the priorities of groupcast CCH and DCH are higher than the priority of DS; the priority of DS is higher than unicast CCH and DCH. Signals and channels sorted in a descending order of the priorities for allocating transmission power are: signals and channels of cellular network communication services, SS of D2D services, broadcast CCH, broadcast DCH, groupcast CCH, groupcast DCH, DS of D2D services, unicast CCH, and unicast DCH.

Method 15:

A method for determining transmission power of channels or signals of each serving cell of a D2D UE determines the priorities for allocating transmission power to channels or signals of a serving cell not entirely based on importance of services of the serving cell. When D2D services and cellular network communication services are sorted according to the priorities for allocating transmission power, the priority of D2D SS is higher than the priorities of all signals and channels of cellular network communication services; the priorities of all signals and channels of cellular network communication services are higher than the priorities of broadcast CCH and DCH; the priorities of broadcast CCH and DCH are higher than the priorities of groupcast CCH and DCH, the priorities of groupcast CCH and DCH are higher than the priority of DS, and the priority of DS is higher than the priorities of unicast CCH and DCH. Signals and channels sorted in a descending order of the priorities for allocating transmission power are: D2D SS, signals and channels of cellular network communication services, broadcast CCH, broadcast DCH, groupcast CCH, groupcast DCH, D2D DS, unicast CCH, and unicast DCH.

Method 16:

A method for determining transmission power of channels or signals of each serving cell of the D2D UE determines the priorities for allocating transmission power to channels or signals of a serving cell not entirely based on importance of services of the serving cell. When D2D services and cellular network communication services are sorted according to the priorities for allocating transmission power, the priority of D2D SS is higher than the priorities of broadcast CCH and DCH; the priorities of broadcast CCH and DCH are higher than the priorities of groupcast CCH and DCH, the priorities of groupcast CCH and DCH are higher than the priorities of all signals and channels of cellular network communication services, the priorities of all signals and channels of cellular network communication services are higher than the priority of DS, the priority of DS is higher than the priorities of unicast CCH and DCH. Signals and channels sorted in a descending order of the priorities for allocating transmission power are: D2D SS, broadcast CCH, broadcast DCH, groupcast CCH, groupcast DCH, signals and channels of cellular network communication services, D2D DS, unicast CCH, and unicast DCH.

Method 17:

A method for determining transmission power of channels and signals in each serving cell of a D2D UE determines priorities for allocating transmission power for channels and signals of a serving cell according to the importance of services of the serving cell. The services may include D2D services and cellular network communication services. When sorted according to the priorities for allocating transmission power, priorities of all signals and channels of cellular network communication services are higher than priorities of all signals and channels of D2D services. Signals and channels sorted in a descending order of the priorities for allocating transmission power are: signals and channels of cellular network communication services, and signals and channels of D2D services. Since cellular network communication is wide-area communication, the priority of cellular network communication services is higher than the priority of D2D services which are local-area services. When priorities are determined in this manner, the work load of the protocol is small.

After the priority of each signal and channel of D2D services and cellular network communication services is determined, a method for allocating power to each signal and channel is described below.

In one sub-frame, transmission power is allocated to signals and channels in a descending order of the priorities for allocating transmission power to the signals and channels. Power is allocated first to a channel or signal with the higher priority. The remaining power is allocated to a channel or a signal with a lower priority after power has been allocated to a channel or signal with a higher priority. The process is repeated until all the power has been allocated. If no remaining power is left after the power is allocated to a channel or signal with a higher priority, no power is allocated to a channel or signal with a lower priority, i.e., the signal or channel with the lower priority will not be transmitted, as shown in FIG. 4.

In addition, if the remaining power after power is allocated to a signal or channel with a third priority is less than power required by one or multiple channels or signals with a lower priority than the third priority, the following describes a few methods for allocating power to the channels or signals with the lower priority.

Method 1:

A method includes proportionally reducing the power of the each of the channels or signals with the lower priority until the sum of all allocated power is smaller than or equal to the maximum power configured in the UE.

Method 2:

A method includes stopping transmission of one or multiple of the channels or signals, i.e., the transmission power of some of the signals or channels is 0, and other signals or channels are selected for transmission until the sum of all allocated power is smaller than or equal to the maximum power configured in the UE.

Method 3:

The power of some of the signals or channels with the lower priority is reduced proportionally according to a certain ratio until the sum of all allocated power is smaller than or equal to the maximum power configured in the UE. For example, for service channels that transmit data, the power of PUSCH of a cellular network, D2D DCH, DCH of D2D PS, DCH of D2D N-PS, broadcast DCH of D2D, groupcast DCH of D2D, unicast DCH of D2D can be adjusted because data of these channels can be merged by re-transmission to enhance performance.

Regarding control channels that transmit control signaling, e.g., PUCCH, CCH of D2D PS, CCH of D2D N-PS, broadcast CCH of D2D, groupcast CCH of D2D, unicast CCH of D2D, the power of the control channels is adjustable in a method. In another method, the power of the control channels is unadjustable, and some of signals are not transmitted, i.e., the transmission power of some of the signals is 0 and other signals are chosen to be transmitted until the sum of all allocated power is smaller than or equal to the maximum power configured for the UE.

With respect to reference signals, e.g., PRACH of a cellular network, SRS, D2D SS, D2D DS, SS of D2D PS, DS of D2D PS, SS of D2D N-PS, and DS of D2D N-PS, some of the signals are not transmitted, i.e., the transmission power of some of the signals is 0, and the other of the signals are selected to be transmitted until the sum of allocated power is smaller than or equal to the maximum power configured for the UE.

A method for proportionally reducing the power of a signal or channel with the lower priority according to a ratio is as follows.

Supposing in sub-frame i, the total transmission power of a UE is larger than the maximum transmission power $\hat{P}_{CMAX}(i)$ configured in the UE, the UE may proportionally adjust the power of channels or signals that have the same priority in serving cell c until the adjusted total transmission power of the UE is smaller than or equal to the maximum transmission power $\hat{P}_{CMAX}(i)$ configured in the UE, i.e., meeting the condition defined in the following formula:

$$\sum_c \sum_l (w_{c,l}(i) \cdot \hat{P}_{c,l}(i)) \leq (\hat{P}_{CMAX}(i) - P_{allocated})$$

In the formula, $\hat{P}_{CMAX}(i)$ is a linear value of the maximum transmission power $P_{CMAX}(i)$ configured for the UE at sub-frame i, $\hat{P}_{c,l}(i)$ is a linear value of the power of channel or signal l in serving cell c, $w_{c,l}(i)$ is an adjustment factor of channel or signal l in serving cell c, and $0 \leq w_{c,l}(i) \leq 1$. There may be one or multiple channels or signals that are transmitted at the same time in a serving cell, or no channel or signal is transmitted, $P_{allocated}$ is the power that has been allocated to signals or channels with higher priorities, $(\hat{P}_{CMAX}(i) - P_{allocated})$ is the remaining power after the power has been allocated to the signals or the channels with higher priorities.

Method 4:

A method includes proportionally reducing the power of the each of the channels or signals with the lower priority according to a ratio until the sum of all allocated power is smaller than or equal to the maximum power configured in the UE.

A method for proportionally reducing the power of a signal or channel with the lower priority according to a ratio is as follows.

Supposing in sub-frame i, the total transmission power of a UE is larger than the maximum transmission power $\hat{P}_{CMAX}(i)$ configured in the UE, the UE may proportionally adjust the power of channels or signals with various priorities in serving cell c until the adjusted total transmission power of the UE is smaller than or equal to the maximum transmission power $\hat{P}_{CMAX}(i)$ configured in the UE, i.e., meeting the condition defined in the following formula:

$$\sum_c \sum_l (w_{c,l}(i) \cdot \hat{P}_{c,l}(i)) \leq (\hat{P}_{CMAX}(i))$$

In the formula, $\hat{P}_{CMAX}(i)$ is a linear value of the maximum transmission power $P_{CMAX}(i)$ configured for the UE at sub-frame i, $\hat{P}_{c,l}(i)$ is a linear value of the power of channel or signal l in serving cell c, $w_{c,l}(i)$ is an adjustment factor of channel or signal l in serving cell c, and $0 \leq w_{c,l}(i) \leq 1$. There may be one or multiple channels or signals that are transmitted at the same time in a serving cell, or no channel or signal is transmitted, signals or channels with different priorities may have different $w_{c,l}(i)$, e.g., signals or channels with higher priorities may have larger $w_{c,l}(i)$ than signals or channels with lower priorities.

Embodiment 2

In the present embodiment, the plural serving cells configured in the system include two serving cells, and one of the serving cells is configured with D2D sub-frames.

Channels and signals mentioned herein may include: PUCCH, PUSCH, PRACH, and SRS of a cellular network, and SS, DS, CCH, and DCH of D2D services. PUSCH of cellular networks and D2D DCH are service channels, and their power can be adjusted because data of the channels can be merged by retransmission to enhance performance. PUCCH of cellular networks and D2D CCH are control channels, and power of the channels is adjustable according to a method. In another method, the power of PUCCH of cellular networks and D2D CCH is unadjustable because the channels cannot be merged by retransmission to enhance performance. PRACH and SRS of cellular networks and SS and DS of D2D are reference signals, and the power of these channels can not be adjusted. According to the classification of the channels and signals, a power control method for determining power of transmission of different signals and channels is shown as Table 9.

TABLE 9

|  | SS | DS | CCH | DCH |
|---|---|---|---|---|
| PUCCH | 2, 3, 4 | 2, 3, 4 | 1, 2, 3, 4 | 1, 2, 4 |
| PUSCH | 2, 3 | 2, 3 | 1, 2, 3 | 1, 2 |
| PRACH | 3, 4 | 3, 4 | 1, 3, 4 | 1, 4 |
| SRS | 3, 4 | 3, 4 | 1, 3, 4 | 1, 4 |

In table 9, "1" indicates adjusting the transmission power of a channel or signal in a column where "1" is located until the total transmission power of an overlapping area is smaller than or equal to $P_{CMAX}$.

In table 9, "2" denotes adjusting the transmission power of a channel or signal in a row where "2" is located until the total transmission power of an overlapping area is smaller than or equal to $P_{CMAX}$.

In table 9, "3" denotes stopping transmission of a channel or signal in a column where "3" is located.

In table 9, "4" denotes stopping transmission of a channel or signal in a row where "4" is located.

In table 9, "1, 2, 3" denotes that a channel or signal in a row and a column where "1, 2, 3" is located may adopt methods corresponding to any of "1", "2", or "3". That is, there are three possible processing methods.

Embodiment 3

In the present embodiment, the plural serving cells configured in the system include two serving cells, and one of the serving cells is configured with D2D sub-frames.

Channels and signals mentioned herein may include: PUCCH, PUSCH, PRACH, and SRS of cellular networks, and SS, DS, PS CCH, PS DCH, N-PS CCH, and N-PS DCH of D2D services. Among the signals and channels, PUSCH of cellular networks and PS DCH and N-PS DCH of D2D services are service channels, and the power of the channels can be adjusted because data of the channels can be merged by retransmission to enhance performance. PUCCH of cellular networks and PS CCH and N-PS CCH of D2D services are control channels, the power of the channels is adjustable in a method. In another method, the power of PUCCH of cellular networks and PS CCH and N-PS CCH of D2D services is unadjustable because the channels cannot be merged by re-transmission to enhance performance. PRACH and SRS of cellular networks and SS and DS of D2D services are reference signals, and the power of the channels can not be adjusted. According to the classification of the channels and signals, a power control method for determining transmission power of different signals and channels is shown as Table 10.

TABLE 10

|  | SS | DS | PS CCH | PS DCH | PS CCH | PS DCH |
|---|---|---|---|---|---|---|
| PUCCH | 2, 3, 4 | 2, 3, 4 | 1, 2, 3, 4 | 1, 2, 4 | 1, 2, 3, 4 | 1, 2, 4 |
| PUSCH | 2, 3 | 2, 3 | 1, 2, 3 | 1, 2 | 1, 2, 3 | 1, 2 |

TABLE 10-continued

|  | SS | DS | PS CCH | PS DCH | PS CCH | PS DCH |
|---|---|---|---|---|---|---|
| PRACH | 3, 4 | 3, 4 | 1, 3, 4 | 1, 4 | 1, 3, 4 | 1, 4 |
| SRS | 3, 4 | 3, 4 | 1, 3, 4 | 1, 4 | 1, 3, 4 | 1, 4 |

In table 10, "1" denotes adjusting the transmission power of a channel or signal in a column where "1" is located until the total transmission power of an overlapping area is smaller than or equal to $P_{CMAX}$.

In table 10, "2" denotes adjusting the transmission power of a channel or signal in a row where "2" is located until the total transmission power of an overlapping area is smaller than or equal to $P_{CMAX}$.

In table 10, "3" denotes stopping transmission of a channel or signal in a column where "3" is located.

In table 10, "4" denotes stopping transmission of a channel or signal in a row where "4" is located.

In table 10, "1, 2, 3" denotes that a channel or signal in a row or column where the "1, 2, 3" locates may adopt the method corresponding to any of "1", "2", or "3". That is, there are three processing methods.

Embodiment 4

In the present embodiment, the plural serving cells configured in the system include two serving cells, and one of the serving cells is configured with D2D sub-frames. Alternatively, the plural serving cells configured in the system include more than two serving cells, and at least one of the serving cells is configured with D2D sub-frames. In overlapping areas of the multiple service cells, a method for processing signals or channels whose priorities are lower than those signals or channels in the following various situations before power is allocated to the signals or channels is provided.

Channels and signals mentioned herein may include: PUCCH, PUSCH, PRACH, and SRS of cellular networks, and PS SS, PS DS, N-PS SS, N-PS DS, PS CCH, PS DCH, N-PS CCH, and N-PS DCH of D2D services. Among the signals and channels, PUSCH of cellular networks, PS DCH and N-PS DCH of D2D services are service channels, and the power of the channels can be adjusted because data of the channels can be merged by retransmission to enhance performance. PUCCH of cellular networks, PS CCH and N-PS CCH of D2D services are control channels, the power of the channels is adjustable in a method, and unadjustable in another method because the channels cannot be merged by retransmission to enhance performance. PRACH and SRS of cellular networks, PS SS, PS DS, N-PS SS, and N-PS DS of D2D services are reference signals, and the power of these channels and signals is unadjustable. According to the classification of the channels and signals, a power control method for determining transmission power of different signals and channels is shown as Table 11.

TABLE 11

|  | PS SS | PS DS | N-PS SS | N-PS DS | PS CCH | PS DCH | PS CCH | PS DCH |
|---|---|---|---|---|---|---|---|---|
| PUCCH | 2, 3, 4 | 2, 3, 4 | 2, 3, 4 | 2, 3, 4 | 1, 2, 3, 4 | 1, 2, 4 | 1, 2, 3, 4 | 1, 2, 4 |
| PUSCH | 2, 3 | 2, 3 | 2, 3 | 2, 3 | 1, 2, 3 | 1, 2 | 1, 2, 3 | 1, 2 |
| PRACH | 3, 4 | 3, 4 | 3, 4 | 3, 4 | 1, 3, 4 | 1, 4 | 1, 3, 4 | 1, 4 |
| SRS | 3, 4 | 3, 4 | 3, 4 | 3, 4 | 1, 3, 4 | 1, 4 | 1, 3, 4 | 1, 4 |

In table 11, "1" denotes adjusting the transmission power of a channel or signal in a column where "1" is located until the total transmission power of an overlapping area is smaller than or equal to $P_{CMAX}$.

In table 11, "2" denotes adjusting the transmission power of a channel or signal in a row where "2" is located until the total transmission power of an overlapping area is smaller than or equal to $P_{CMAX}$.

In table 11, "3" denotes stopping transmission of a channel or signal in a column where "3" is located.

In table 11, "4" denotes stopping transmission of a channel or signal in a row where "4" is located.

In table 11, "1, 2, 3" indicates that a channel or signal in a row or column where "1, 2, 3" is located may adopt the method corresponding to any of "1", "2", or "3", i.e., there are three possible processing methods.

Embodiment 5

In the present embodiment, the plural serving cells configured in the system include two serving cells, and one of the serving cells is configured with D2D sub-frames.

Channels and signals mentioned herein may include: PUCCH, PUSCH, PRACH, and SRS of cellular networks and SS, DS, broadcast CCH, broadcast DCH, groupcast CCH, groupcast DCH, unicast CCH, and unicast DCH of D2D services. Among the channels and signals, PUSCH of cellular networks and broadcast DCH, groupcast DCH, and unicast DCH of D2D services are service channels, and the power of the channels is adjustable because data of the channels can be merged by retransmission to enhance performance. PUCCH of cellular networks, broadcast CCH, groupcast CCH and unicast CCH of D2D services are control channels, the power of the channels is adjustable in one method, and unadjustable in another method because the channels cannot be merged by retransmission to enhance performance. PRACH and SRS of cellular networks, SS and DS of D2D services are reference signals, and the power of these channels and signals is unadjustable. According to the classification of the channels and signals, a power control method for determining the power of transmission of different signals and channels is shown as Table 12.

TABLE 12

|  | SS | DS | Broacast CCH | Broadcast DCH | Groupcast CCH | Groupcast DCH | Unicast CCH | Unicast DCH |
|---|---|---|---|---|---|---|---|---|
| PUCCH | 2, 3, 4 | 2, 3, 4 | 1, 2, 3, 4 | 1, 2, 4 | 1, 2, 3, 4 | 1, 2, 4 | 1, 2, 3, 4 | 1, 2, 4 |
| PUSCH | 2, 3 | 2, 3 | 1, 2, 3 | 1, 2 | 1, 2, 3 | 1, 2 | 1, 2, 3 | 1, 2 |
| PRACH | 3, 4 | 3, 4 | 1, 3, 4 | 1, 4 | 1, 3, 4 | 1, 4 | 1, 3, 4 | 1, 4 |
| SRS | 3, 4 | 3, 4 | 1, 3, 4 | 1, 4 | 1, 3, 4 | 1, 4 | 1, 3, 4 | 1, 4 |

In table 12, "1" denotes adjusting the transmission power of a channel or signal in a column where "1" is located until the total transmission power of an overlapping area is smaller than or equal to $P_{CMAX}$.

In table 12, "2" denotes adjusting the transmission power of a channel or signal in a row where "2" is located until the total transmission power of an overlapping area is smaller than or equal to $P_{CMAX}$.

In table 12, "3" denotes stopping transmission of a channel or signal in a column where "3" is located.

In table 12, "4" denotes stopping transmission of a channel or signal in a row where "4" is located.

In table 12, "1, 2, 3" denotes that a channel or signal in a row or column where "1, 2, 3" is located may adopt the methods corresponding to any of "1", "2", or "3", i.e., there are three possible processing methods.

Embodiment 6

In the present embodiment, the plural serving cells configured in the system include two serving cells configured with D2D sub-frames.

Channels and signals mentioned herein may include: SS, DS, PS CCH, PS DCH, N-PS CCH, and N-PS DCH of D2D. The PS DCH and N-PS DCH are service channels, and their power can be adjusted because data of PS DCH and N-PS DCH can be merged by retransmission to enhance performance. PS CCH and N-PS CCH are control channels whose power is adjustable in one method and unadjustable in another method because the two channels cannot be merged by retransmission to enhance performance. SS and DS are reference signals, and their power can not be adjusted. According to the classification of the channels and signals, a control method for determining the transmission power of different signals and channels is shown as Table 13.

TABLE 13

|  | SS | DS | PS CCH | PS DCH | N-PS CCH | N-PS DCH |
|---|---|---|---|---|---|---|
| SS | 3, 4 |  |  |  |  |  |
| DS | 3, 4 | 3, 4 |  |  |  |  |
| PS CCH | 2, 3, 4 | 2, 3, 4 | 1, 2, 3, 4 |  |  |  |
| PS DCH | 2, 3 | 2, 3 | 1, 2, 3 | 1, 2 |  |  |
| N-PS CCH | 2, 3, 4 | 2, 3, 4 | 1, 2, 3, 4 | 1, 2, 4 | 1, 2, 3, 4 |  |
| N-PS DCH | 2, 3 | 2, 3 | 1, 2, 3 | 1, 2 | 1, 2, 3 | 1, 2 |

In table 13, "1" indicates adjusting the transmission power of a channel or signal in a column where "1" is located until the total transmission power of an overlapping area is smaller than or equal to $P_{CMAX}$.

In table 13, "2" indicates adjusting the transmission power of a channel or signal in a row where "2" is located until the total transmission power of an overlapping area is smaller than or equal to $P_{CMAX}$.

In table 13, "3" indicates stopping transmission of a channel or signal in a column where "3" is located.

In table 13, "4" indicates stopping transmission of a channel or signal in a row where "4" is located.

In table 13, "1, 2, 3" indicates that a channel or signal in a row or column in which "1, 2, 3" is located may adopt the method corresponding to any of "1", "2" and "3". That is, there are three processing methods.

Embodiment 7

In the present embodiment, the plural serving cells configured in the system include two serving cells configured with D2D sub-frames.

Channels and signals mentioned herein may include: SS, DS, broadcast CCH, broadcast DCH, groupcast CCH, groupcast DCH, unicast CCH, and unicast DCH of D2D services. Broadcast DCH, groupcast DCH, and unicast DCH are service channels whose power is adjustable because data of broadcast DCH, groupcast DCH, and unicast DCH can be merged by retransmission to enhance performance. Broadcast CCH, groupcast CCH, and unicast CCH of D2D services are control channels whose power is adjustable in one method and unadjustable in another method because the channels cannot be merged by retransmission to enhance performance. SS and DS of D2D services are reference signals whose power is unadjustable. According to the classification of the channels and signals, a control method for determining the power of transmission of different signals and channels is shown as Table 14.

TABLE 14

|  | SS | DS | Broadcast CCH | Broadcast DCH | Groupcast CCH | Groupcast DCH | Unicast CCH | Unicast DCH |
|---|---|---|---|---|---|---|---|---|
| SS | 3, 4 |  |  |  |  |  |  |  |
| DS | 3, 4 | 3, 4 |  |  |  |  |  |  |
| Broadcast CCH | 2, 3, 4 | 2, 3, 4 | 1, 2, 3, 4 |  |  |  |  |  |
| Broadcast DCH | 2, 3 | 2, 3 | 1, 2, 3 | 1, 2 |  |  |  |  |
| Groupcast CCH | 2, 3, 4 | 2, 3, 4 | 1, 2, 3, 4 | 1, 2, 4 |  | 1, 2, 3, 4 |  |  |
| Groupcast DCH | 2, 3 | 2, 3 | 1, 2, 3 | 1, 2 | 1, 2, 3 | 1, 2 |  |  |

TABLE 14-continued

| | SS | DS | Broadcast CCH | Broadcast DCH | Groupcast CCH | Groupcast DCH | Unicast CCH | Unicast DCH |
|---|---|---|---|---|---|---|---|---|
| Unicast CCH | 2, 3, 4 | 2, 3, 4 | 1, 2, 3, 4 | 1, 2, 4 | 1, 2, 3, 4 | 1, 2, 4 | 1, 2, 3, 4 | |
| Unicast DCH | 2, 3 | 2, 3 | 1, 2, 3 | 1, 2 | 1, 2, 3 | 1, 2 | 1, 2, 3 | 1, 2 |

In table 14, "1" indicates adjusting the transmission power of a channel or signal in a column where "1" is located until the total transmission power of an overlapping area is smaller than or equal to $P_{CMAX}$.

In table 14, "2" indicates adjusting the transmission power of a channel or signal in a row where "2" is located until the total transmission power of an overlapping area is smaller than or equal to $P_{CMAX}$.

In table 14, "3" indicates stopping transmission of a channel or signal in a column where "3" is located.

In table 14, "4" indicates stopping transmission of a channel or signal in a row where "4" is located.

In table 14, "1, 2, 3" indicates that a channel or signal in a row or column where "1, 2, 3" is located may adopt the method corresponding to any of "1", "2", and "3". That is, there are three processing methods.

Embodiments 1 to 7 are applicable to a situation where sub-frames of plural serving cells are aligned to each other, i.e., a method of processing the same sub-frame n of plural serving cells.

Embodiment 8

The present embodiment is applicable to a situation where sub-frames of plural serving cells are unaligned with each other, i.e., a signal or channel in sub-frame n of a serving cell may overlap with signals or channels in sub-frames n−1, n and n+1 of other serving cells.

As shown in FIG. 5, when a signal or channel in sub-frame n of serving cell C1 may overlap with signals or channels of sub-frames n−1, n and n+1 of other serving cells, different overlapping areas are processed according to the methods of embodiments 1-7 respectively. After the processing, remaining parts other than the overlapping areas in the sub-frame may be processed using any of the following methods.

1) If the power of an overlapping area exceeds the maximum transmission power configured for the UE, only the power of the overlapping area of the signal or channel is adjusted. For example, if the power of overlapping area 1 needs to be adjusted while the power of overlapping area 2 does not need to be adjusted in serving cell C1, only the power of the overlapping area 1 is to be adjusted.

2) If the power of an overlapping area exceeds the maximum transmission power configured for the UE, the power of the whole signal or channel is adjusted. For example, if the power of overlapping area 1 needs to be adjusted while the power of overlapping area 2 does not need to be adjusted in serving cell C1, the power of the whole sub-frame n is to be adjusted in serving cell C1.

3) If transmission of a signal or channel is to be stopped in an overlapping area, the transmission of the signal or channel is stopped in the whole sub-frame. For example, if transmission of a signal or channel needs to be stopped in overlapping area 1 while transmission of the signal or channel does not need to be stopped in overlapping area 2 in serving cell C1, the transmission of the signal or channel is to be stopped in the whole sub-frame n in serving cell C1.

Embodiment 9

The present embodiment is applicable to a situation where multiple Time Advance (TA) are configured in plural serving cells, i.e., a signal or channel in sub-frame n of a serving cell may slightly overlap with signals or channels in sub-frames n−1 and n+1 of other serving cells (e.g., there may be an overlap of 30 micro second).

As shown in FIG. 5, when a signal or channel in sub-frame n of serving cell C1 may overlap with signals or channels of sub-frames n−1, n and n+1 of other serving cells, different overlapping areas are processed according to the methods of embodiments 1-7 respectively. After the processing, remaining parts other than the overlapping areas in the sub-frame may be processed using any of the following methods.

1) If the power of an overlapping area exceeds the maximum transmission power configured for the UE, only the power of the overlapping area of the signal or channel is adjusted. For example, if the power of overlapping area 1 needs to be adjusted while the power of overlapping area 2 does not need to be adjusted in serving cell C1, only the power of the overlapping area 1 is to be adjusted.

2) If the power of an overlapping area exceeds the maximum transmission power configured in the UE, the power of the whole signal or channel is adjusted. For example, if the power of overlapping area 1 needs to be adjusted while the power of overlapping area 2 does not need to be adjusted in serving cell C1, the power of the whole sub-frame n is to be adjusted in serving cell C1.

3) If transmission of a signal or channel is to be stopped in an overlapping area, the transmission of the signal or channel is stopped in the whole sub-frame. For example, if transmission of a signal or channel needs to be stopped in overlapping area 1 while transmission of the signal or channel does not need to be stopped in overlapping area 2 in serving cell C1, the transmission of the signal or channel is to be stopped in the whole sub-frame n in serving cell C1.

According to embodiments 8 and 9, instead of using the same processing manner, different methods may be applied to situations where the overlapping areas are relatively larger or smaller respectively.

Embodiment 10

When the total transmission power required by signals or channels of all serving cells configured for a UE is larger than the maximum transmission power configured in the UE, the priority of each signal and channel in D2D services and cellular network services is determined, and transmission power is determined for each signal or channel in each serving cell of a D2D UE.

In the present embodiment, the priority for allocating transmission power to a signal or a channel in a serving cell is determined according to the importance of services in the serving cell. The services mentioned may include D2D services and cellular network communication services. When sorted according to the priority for allocating transmission power, all of signals and channels of D2D services (including: D2D SS, D2D DS and D2D communication signals) have the same priority with PUSCH without UCI in the cellular network communication services while priorities of channels in a conventional cellular network communication system remain unchanged.

After the priority of each signal and channel of the D2D services and cellular network services is determined, transmission power is allocated to each signal and channel according to the following method.

In one sub-frame, transmission power is allocated to signals and channels in a descending order of the priorities for allocating transmission power to the signals and channels. That is, transmission power is first allocated to a channel or a signal having a high priority, and then the remaining transmission power is allocated to a channel or a signal having a lower priority after transmission power has been allocated to channels or signals having higher priorities, then the procedures are repeated until all the transmission power is allocated. If no remaining power is left after the power is allocated to a channel or a signal having a relatively higher priority, the power allocated to a channel or a signal having a lower priority is 0, i.e., the signal or the channel having the lower priority will not be transmitted, as shown in FIG. 4.

In addition, if the remaining power is not enough to meet the demand of one or multiple signals or channels having a lower priority after the power is allocated to a signal or a channel having a relatively higher priority, the power allocated to channels or signals having the lower priority is reduced proportionally. Supposing power is to be allocated to signals or channels in D2D services and cellular network communication services that have the same priority with PUSCH without UCI, the method of proportionally reducing the power of signals or channels of the priority may be as follows.

Supposing in sub-frame i, the total transmission power of a UE is larger than the maximum transmission power $\hat{P}_{CMAX}(i)$ configured in UE, the UE may proportionally adjust the power of PUSCH without UCI and the power of D2D channels or signals that have the same priority with the PUSCH without UCI in serving cell c until the adjusted total transmission power of the UE is smaller than or equal to the maximum transmission power $\hat{P}_{CMAX}(i)$ configured in the UE, i.e., meeting the condition defined in the following formula:

$$\sum_{c \neq j, c \neq c1} \left( w(i) \cdot \hat{P}_{PUSCH,c}(i) \right) + w(i) \cdot \hat{P}_{D2D,c1}(i) \leq$$
$$\left( \hat{P}_{CMAX}(i) - \hat{P}_{PUCCH}(i) - \hat{P}_{PUSCH,j}(i) \right)$$

In the formula, the $\hat{P}_{CMAX}(i)$ is a linear value of the maximum transmission power $P_{CMAX}$ configured in the UE for sub-frame i;

$\hat{P}_{PUCCH}(i)$ is a linear value of the power $P_{PUCCH}(i)$ of PUCCH;

$\hat{P}_{PUCCH,j}(i)$ is a linear value of the power $P_{PUCCH,j}(i)$ of PUSCH with UCI in serving cell j;

$\hat{P}_{PUCCH,c}(i)$ is a linear value of the power $P_{PUCCH,c}(i)$ of PUSCH without UCI in serving cell c;

w(i) is a power adjustment factor, and 0≤w(i)≤1;

$\hat{P}_{D2D,c1}(i)$ is a linear value of the power $P_{D2D,c1}(i)$ of a D2D channel or signal (including D2D SS, D2D DS and D2D communication signals) in serving cell c1.

Embodiment 11

When the total transmission power required by signals or channels of all serving cells configured for a UE is larger than the maximum transmission power configured in the UE, the priority of each signal and channel in D2D services and cellular network services is determined, and transmission power is determined for each signal or channel in each serving cell of a D2D UE.

In the present embodiment, the priority to be allocated to a signal or a channel in a serving cell is determined according to the importance of services in the serving cell. The services mentioned here may include D2D services and cellular network communication services. When sorted according to the priority for allocating transmission power to signals and channels, all of signals and channels of D2D services (including: D2D SS, D2D DS and D2D communication signals) have the same priority with PUSCH without UCI in the cellular network communication services while priorities of channels in a conventional cellular network communication system remain unchanged, the priority of D2D SS is higher than the priority of PUSCH without UCI in the cellular network communication services and is lower than the priority of PUSCH with UCI in the cellular network communication services.

After the priority of each signal and channel of the D2D services and cellular network services is determined, transmission power is allocated to each signal and channel according to the following method.

In one sub-frame, transmission power is allocated to signals and channels in a descending order of priorities for allocating transmission power to the signals and channels. That is, transmission power is first allocated to a channel or a signal having a high priority, and then the remaining transmission power is allocated to a channel or a signal having a relatively lower priority after transmission power has been allocated to channels or signals having higher priorities, then the procedures are repeated until all the transmission power is allocated. If no remaining power is left after the power is allocated to a channel or a signal having a relatively higher priority, the power allocated to a channel or a signal having a lower priority is 0, i.e., the signal or the channel having the lower priority will not be transmitted, as shown in FIG. 4.

In addition, if the remaining power is not enough to meet the demand of one or multiple signals or channels having the same priority after the power is allocated to a signal or a channel having a relatively higher priority, the power for the channels or signals having the lower priority is reduced proportionally. The method of reducing the power proportionally may be as follows.

Supposing in sub-frame i, the total transmission power of a UE is larger than the maximum transmission power $\hat{P}_{CMAX}(i)$ configured in the UE, if there is power left after power is allocated to the PUSCH with UCI in the cellular network communication services, the UE may first allocate transmission power to D2D SS in serving cell c having the same priority, then proportionally adjust the power of PUSCH without UCI, D2D DS and D2D communication signals in the serving cell c having the same priority until the adjusted total transmission power of the UE is smaller than or equal to the maximum transmission power $\hat{P}_{CMAX}(i)$ configured in the UE, i.e., meeting the condition defined in the following formula:

$$\hat{P}_{D2DSS}(i) = \text{Min}\left(\left(\hat{P}_{CMAX}(i) - \hat{P}_{PUCCH}(i) - \hat{P}_{PUSCH,j}(i)\right), \hat{P}_{D2DDS}(i)\right)$$

$$\sum_{c \neq j, c \neq c1} \left(w(i) \cdot \hat{P}_{PUSCH,c}(i)\right) + w(i) \cdot \hat{P}_{D2D,c1}(i) \leq$$

$$\left(\hat{P}_{CMAX}(i) - \hat{P}_{PUCCH}(i) - \hat{P}_{PUSCH,j}(i) - \hat{P}_{D2DSS}(i)\right)$$

In the formula, $\hat{P}_{CMAX}(i)$ is a linear value of the maximum transmission power $P_{CMAX}$ configured in the UE for subframe i;

$\hat{P}_{PUCCH}(i)$ a linear value of power $P_{PUCCH}(i)$ of PUCCH in serving cell c;

$\hat{P}_{PUSCH,j}(i)$ is a linear value of the power $P_{PUSCH,j}(i)$ of PUSCH with UCI in serving cell j;

$\hat{P}_{D2DSS}(i)$ is a linear value of the power $P_{D2DSS}(i)$ of D2D SS;

$\hat{P}_{PUSCH,c}(i)$ is a linear value of the power $P_{PUSCH,c}(i)$ of PUSCH without UCI in serving cell c;

w(i) is a power adjustment factor, and 0≤w(i)≤1;

$\hat{P}_{D2D,c1}(i)$ is a linear value of power $P_{D2D,c1}(i)$ of D2D DS and D2D communication signals in serving cell c1.

Embodiment 12

In the present embodiment, the plural serving cells configured by the system include two serving cells, and one of the two serving cells is configured with D2D sub frames. Alternatively, the plural serving cells configured by the system include more than two serving cells, and at least one of the more than two serving cells is configured with D2D sub-frames. The UE may get information on whether the D2D service to be transmitted is PS or N-PS by one of the following methods.

Method 1:

The UE may get the information from an explicit signaling indication received. In an example, the UE may get the information by receiving higher layer configuration information sent by an eNB or a control node. In another example, the UE may get the information by receiving MAC signaling configuration information sent by an eNB or a control node. In yet another example, the UE may get the information by receiving physical layer signaling sent by an eNB or a control node, e.g., scheduling Assignment signaling.

Method 2:

The UE may get the information from an inexplicit indication. For example, the UE may get information on whether the D2D service to be transmitted is PS or N-PS from the carrier frequency of resources used. The UE may obtain the information from different time/frequency resources that are used.

Embodiment 13

In the present embodiment, the plural serving cells configured by the system include two serving cells, and one of the two serving cells is configured with D2D sub frames. Alternatively, the plural serving cells configured by the system include more than two serving cells, and at least one of the more than two serving cells is configured with D2D sub-frames. The UE may get information on whether the D2D services transmitted is broadcast services, groupcast services or unicast services by using one of the following methods.

Method 1:

The UE may get the information from an explicit signaling indication received. In an example, the UE may get the information by receiving higher layer signaling configuration information sent by an eNB or a control node. In another example, the UE may get the information by receiving MAC signaling configuration information sent by an eNB or a control node. In yet another example, the UE may get the information by receiving physical layer signaling sent by an eNB or a control node, e.g., scheduling Assignment signaling.

Method 2:

The UE may get the information from an inexplicit indication. For example, the UE may get information on whether the D2D service to be transmitted is broadcast services, groupcast services or unicast services from the carrier frequency of resources to be used. The UE may obtain the information from different time/frequency resources that are to be used.

Corresponding to the above methods, the present disclosure also provides a user equipment. The user equipment is applicable to a system having serving cells configured with D2D sub-frames. As shown in FIG. 6, the user equipment includes: a power calculating module, a power allocating module and a transmitting module.

The power calculating module is configured to calculate transmission power required by each configured serving cell respectively.

The power allocating module is configured to determine a channel or a signal that may be transmitted in each serving cell and allocate transmission power for each channel or signal determined according to the amount of the total transmission power required by all of the configured serving cells and the amount of maximum transmission power configured in the UE and the condition of the configured serving cells.

The transmitting module is configured to transmit the channel or the signal of the serving cell according to the allocated transmission power.

The foregoing are only preferred examples of the present disclosure and are not for use in limiting the protection scope thereof. All modifications, equivalent replacements or improvements in accordance with the spirit and principles of the present disclosure shall be included in the protection scope of the present disclosure.

The invention claimed is:

1. A power control method, applicable to a system configured with serving cells, comprising:

A, calculating, by a user equipment (UE), transmission power required by each of the serving cells configured for the UE, wherein at least one of the serving cells is configured with device to device (D2D) sub-frames;

B, determining, by the UE, a channel or a signal that is possible to be transmitted in each of the serving cells and allocating transmission power for the channel or signal according to conditions of the serving cells configured for the UE and a relation between an amount of total transmission power required by all of the serving cells configured for the UE and an amount of maximum transmission power configured for the UE; and C, transmitting, by the UE, the channel or signal of a serving cell according to the transmission power allocated to the channel or signal of the serving cell, wherein the allocating the transmission power for the channel or signal comprises allocating the transmission power for the channel or signal according to a priority for allocating transmission power of the channel or signal of each of the serving cells, and wherein the priority is determined based on whether the channel or signal is related to D2D service, cellular network communication service, public safety (PS) service, or non-public safety (N-PS) service.

2. The method of claim 1, wherein the total transmission power required by all of the serving cells configured for the UE is a sum of transmission power required by channels or signals in an overlapping area in serving cells which overlap with each other.

3. The method of claim 2, wherein the step B comprises:
allocating transmission power required by the channel or signal of each of the serving cells in the overlapping area according to a calculation result of the step A if the sum of transmission power required by channels or signals in the overlapping area is smaller than or equal to the maximum transmission power configured in the UE.

4. The method of claim 2, wherein the step B comprises:
allocating transmission power required by at least two channels or signals that can be transmitted at the same time in the overlapping area according to a calculation result of the step A if the sum of transmission power required by channels or signals in the overlapping area is smaller than or equal to the maximum transmission power configured in the UE; and
allocating transmission power required by a channel or signal with high priority in the channels or signals that cannot be transmitted at the same time according to a calculation result of the step A, and allocating no transmission power to a channel or signal with low priority in the channels or signals that cannot be transmitted at the same time,
wherein the high priority and the low priority are determined according to the priority for allocating transmission power.

5. The method of claim 4, wherein
allocating no transmission power to the channel or signal with the low priority in a sub-frame in the overlapping area if sub-frames of the serving cells are not aligned to each other and the channels or signals of the sub-frames cannot be transmitted at the same time.

6. The method of claim 4, wherein whether the at least two channels or signals can be transmitted at the same time is determined according to Table 1:

7. The method of claim 2, wherein the step B comprises:
allocating transmission power to the channel or signal of each of the serving cells in the overlapping area according to the priority of the channel or signal if the sum of transmission power of the signals or channels in the overlapping area is larger than the maximum transmission power configured in the UE.

8. The method of claim 7, wherein
allocating transmission power only to a channel or a signal in the overlapping area of a sub-frame according to the priority of the channel or signal of each of the serving cells if sub-frames of the serving cells are not aligned to each other; or allocating transmission power to a channel or signal in a sub-frame with the overlapping area according to the priority of the channel or signal of each of the serving cells.

9. The method of claim 1, wherein
an order of signals and channels sorted in a descending order of the priorities for allocating transmission power is one of:
channels and signals of PS services, channels and signals of cellular network communication services, and channels and signals of N-PS services;
channels and signals of cellular network communication services, channels and signals of PS services, and channels and signals of N-PS services;
channels and signals of PS services, synchronization signal (SS) of N-PS services, discovery signal (DS) of N-PS services, channels and signals of cellular network communication services, control channel (CCH) of N-PS services, and data channel (DCH) of N-PS services;
SS of D2D services, DS of D2D services, channels and signals of cellular network communication services, CCH of D2D services, and DCH of D2D services;
SS of D2D services, DS of D2D services, CCH of PS services, DCH of PS services, channels and signals of cellular network communication services, CCH of N-PS services, and DCH of N-PS services;

TABLE 1

|  | PUCCH. | PUSCH. | PRACH. | SRS. | SS. | DS. | PS CCH. | PS DCH. | N-PS CCH. | N-PS DCH. |
|---|---|---|---|---|---|---|---|---|---|---|
| PUCCH. | Y/N/C. |  |  |  |  |  |  |  |  |  |
| PUSCH. | Y/N/C. | Y. |  |  |  |  |  |  |  |  |
| PRACH. | Y/N/C. | Y/N/C. | Y/N/C. |  |  |  |  |  |  |  |
| SRS. | Y/N/C. | Y/N/C. | Y/N/C. | Y/N/C. |  |  |  |  |  |  |
| SS. | Y/N/C. | Y/N/C. | Y/N/C. | Y/N/C. | Y/N/C. |  |  |  |  |  |
| DS. | Y/N/C. | Y/N/C. | Y/N/C. | Y/N/C. | Y/N/C. | Y/N/C. |  |  |  |  |
| PS CCH. | Y/N/C. | Y/N/C. | Y/N/C. | Y/N/C. | Y/N/C. | Y/N/C. | Y/N/C. |  |  |  |
| PS DCH. | Y/N/C. | Y/N/C. | Y/N/C. | Y/N/C. | Y/N/C. | Y/N/C. | Y/N/C. | Y. |  |  |
| N-PS CCH. | Y/N/C. | Y/N/C. | Y/N/C. | Y/N/C. | Y/N/C. | Y/N/C. | Y/N/C. | Y/N/C. | Y/N/C. |  |
| N-PS DCH. | Y/N/C. | Y/N/C. | Y/N/C. | Y/N/C. | Y/N/C. | Y/N/C. | Y/N/C. | Y/N/C. | Y/N/C. | Y. | the "Y" in Table 1 indicates two channels corresponding to the "Y" can be transmitted at the same time, the "N" in Table 1 indicates two channels corresponding to the "N" cannot be transmitted at the same time, the "C" in Table 1 indicates whether two channels corresponding to the "C" cannot be transmitted at the same time is configured by higher layer signaling, and the "Y/N/C" indicates 3 methods are applicable to two channels corresponding to the "Y/N/C".

SS of D2D services, CCH of PS services, DCH of PS services, channels and signals of cellular network communication services, DS of D2D services, CCH of N-PS services, and DCH of N-PS services;
SS of D2D services, DS of D2D services, channels and signals of cellular network communication services, CCH of PS services, DCH of PS services, CCH of N-PS services, and DCH of N-PS services;
SS of D2D services, channels and signals of cellular network communication services, CCH of PS services, DCH of PS services, DS of D2D services, CCH of N-PS services, and DCH of N-PS services;
channels and signals of cellular network communication services, SS of D2D services, DS of D2D services, CCH of PS services, DCH of PS services, CCH of N-PS services, and DCH of N-PS services;
channels and signals of cellular network communication services, SS of D2D services, CCH of PS services, DCH of PS services, DS of D2D services, CCH of N-PS services, and DCH of N-PS services;
channels and signals of cellular network communication services, SS of D2D services, DS of D2D services, CCH of broadcast services, DCH of broadcast services, CCH of groupcast services, DCH of groupcast services, CCH of unicast services, and DCH of unicast services;
SS of D2D services, DS of D2D services, channels and signals of cellular network communication services, DCH of broadcast services, CCH of broadcast services, DCH of groupcast services, CCH of groupcast services, CCH of unicast services, and DCH of unicast services;
SS of D2D services, DS of D2D services, CCH of broadcast services, DCH of broadcast services, CCH of groupcast services, DCH of groupcast services, channels and signals of cellular network communication services, CCH of unicast services, and DCH of unicast services;
channels and signals of cellular network communication services, SS of D2D services, CCH of broadcast services, DCH of broadcast services, CCH of groupcast services, DCH of groupcast services, DS of D2D services, CCH of unicast services, and DCH of unicast services;
SS of D2D services, channels and signals of cellular network communication services, CCH of broadcast services, DCH of broadcast services, CCH of groupcast services, DCH of groupcast services, DS of D2D services, CCH of unicast services, and DCH of unicast services;
SS of D2D services, CCH of broadcast services, DCH of broadcast services, CCH of groupcast services, DCH of groupcast services, channels and signals of cellular network communication services, DS of D2D services, CCH of unicast services, and DCH of unicast services;
channels and signals of cellular network communication services, and channels and signals of D2D services.

10. The method of claim 9, wherein
signals and channels of PS services and N-PS services sorted in a descending order of priorities for allocating transmission power are: SS, DS, CCH, and DCH of one D2D service; and
signals and channels of cellular network communication services sorted in a descending order of priorities for allocating transmission power are: physical random access channel (PRACH), physical uplink control channel (PUCCH), physical uplink shared channel (PUSCH) with uplink control information (UCI), PUSCH without UCI, and sounding reference signal (SRS).

11. The method of claim 7, wherein
priority of D2D services is the same with the priority of physical uplink shared channel (PUSCH) without uplink control information (UCI) of cellular network communication services, and
wherein channels or signals of D2D services include D2D SS, and D2D DS and D2D communication signals.

12. The method of claim 11, wherein the allocating transmission power to the signal or channel of each of the serving cells according to the priority of the signal or channel comprises:
allocating transmission power according to the descending order of the priorities, wherein transmission power is first allocated to a channel or signal having a high priority, remaining transmission power after allocation to the channel or signal having the highest priority is allocated to channels or signals having lower priorities than the highest priority; if the remaining transmission power is less than transmission power required by one or multiple channels or signals having a lower priority than the highest priority, proportionally reducing the transmission power required by the one or multiple channels or signals having the lower priority until the sum of all of allocated transmission power is smaller than or equal to the maximum transmission power configured in the UE;
wherein the proportionally reducing the transmission power required by the one or multiple channels or signals having the lower priority comprises:
for sub-frame i, proportionally adjusting, by the UE, transmission power of PUSCH without UCI and channels or signals of D2D services in serving cell c that have the same priority until the following condition is met:

$$\sum_{c \ne j, c \ne c1} \left( w(i) \cdot \hat{P}_{PUSCH,c}(i) \right) + w(i) \cdot \hat{P}_{D2D,c1}(i) \le$$

$$\left( \hat{P}_{CMAX}(i) - \hat{P}_{PUCCH}(i) - \hat{P}_{PUSCH,j}(i) \right)$$

wherein the $\hat{P}_{CMAX}(i)$ is a linear value of the maximum transmission power $P_{CMAX}$ configured in the UE for sub-frame i;
$\hat{P}_{PUCCH}(i)$ is a linear value of the power of PUCCH $P_{PUCCH}(i)$;
$\hat{P}_{PUCCH,j}(i)$ is a linear value of the power of PUSCH with UCI $P_{PUCCH,j}(i)$ in serving cell j;
$\hat{P}_{PUCCH,c}(i)$ is a linear value of the power of PUSCH without UCI $P_{PUCCH,c}(i)$ in serving cell c;
w(i) is a power adjustment factor, and 0≤w(i)≤1; and
$\hat{P}_{D2D,c1}(i)$ is a linear value of power of channels or signals of D2D services $P_{D2D,c1}(i)$ in serving cell c1.

13. The method of claim 7, wherein
priority of D2D DS and D2D communication signals is the same with the priority of physical uplink shared channel (PUSCH) without uplink control information (UCI) of cellular network communication services, the priority of D2D SS is higher than the priority of PUSCH without UCI of cellular network communication services, the priority of D2D SS is lower than the priority of PUSCH with UCI of cellular network communication services.

14. The method of claim 11, wherein the allocating transmission power to the signal or channel of each of the serving cells according to the priority of the signal or channel comprises:
allocating transmission power according to the descending order of the priorities, wherein transmission power is first allocated to a channel or signal having a high priority, remaining transmission power after allocation to the channel or signal having the highest priority is allocated to channels or signals having lower priorities than the highest priority; if the remaining transmission power is less than transmission power required by one or multiple channels or signals having a lower priority than the highest priority, the transmission power required by the one or multiple channels or signals having the lower priority is reduced proportionally until the sum of all of allocated transmission power is smaller than or equal to the maximum transmission power configured in the UE;

wherein the proportionally reducing the transmission power required by the one or multiple channels or signals having the lower priority comprises:

for sub-frame i, allocating transmission power to D2D SS according to $\hat{P}_{D2DSS}(i)=\text{Min}((\hat{P}_{CMAX}(i)-\hat{P}_{PUCCH}(i)-\hat{P}_{PUSCH,j}(i)), \hat{P}_{D2DSS}(i))$, and proportionally adjusting, by the UE, transmission power of PUSCH without UCI and D2D DS and D2D communication signals in serving cell c that have the same priority until the following condition is met:

$$\sum_{c \ne j, c \ne c1} \left( w(i) \cdot \hat{P}_{PUSCH,c}(i) \right) + w(i) \cdot \hat{P}_{D2D,c1}(i) \le$$
$$\left( \hat{P}_{CMAX}(i) - \hat{P}_{PUCCH}(i) - \hat{P}_{PUSCH,j}(i) - \hat{P}_{D2DSS}(i) \right)$$

wherein the $\hat{P}_{CMAX}(i)$ is a linear value of the maximum transmission power $P_{CMAX}$ configured in the UE for sub-frame i;

$\hat{P}_{PUCCH}(i)$ is a linear value of the power of PUCCH $P_{PUCCH}$ in serving cell c;

$\hat{P}_{PUSCH,j}(i)$ is a linear value of the power of PUSCH with UCI $P_{PUSCH,j}(i)$ in serving cell j;

$\hat{P}_{D2DSS}(i)$ is a linear value of the power of D2D SS $P_{D2DSS}(i)$;

$\hat{P}_{PUSCH,c}(i)$ is a linear value of the power of PUSCH without UCI $P_{PUSCH,c}(i)$ in serving cell c;

w(i) is a power adjustment factor, and $0 \le w(i) \le 1$; and $\hat{P}_{D2D,c1}(i)$ is a linear value of power of D2D DS and D2D communication channels $P_{D2D,c1}(i)$ in serving cell c1.

15. The method of claim 7, wherein the allocating transmission power to the signal or channel of each of the serving cells according to the priority of the signal or channel comprises:

allocating transmission power to signals and channels in the descending order of the priorities for allocating transmission power to the signals and channels, wherein transmission power is first allocated to a channel or a signal having the highest priority, the remaining transmission power is allocated to a channel or a signal having a lower priority than the highest priority after transmission power has been allocated to the channel or signal having highest priority, the process is repeated until all the transmission power has been allocated.

16. The method of claim 15, further comprising:

allocating no power to a channel or signal having a first priority if there is no remaining power after transmission power is allocated to a channel or signal having a higher priority than the first priority;

allocating transmission power to one or multiple channels or signals having a third priority according to one of the following manners if the remaining power is less than transmission power required by the one or multiple channels or signals after transmission power is allocated to a signal or channel having a higher priority than the third priority:

proportionally reducing the transmission power of each of the one or multiple channels or signals that have the third priority until the sum of all of allocated transmission power is smaller than or equal to the maximum transmission power configured in the UE; or allocating transmission power required by at least one channel or signal of the one or multiple channels or signals, and allocating no transmission power to other signals or channels of the one or multiple channels until the sum of all of allocated transmission power is smaller than or equal to the maximum transmission power configured in the UE; or proportionally reducing the transmission power of at least one of the one or multiple channels or signals that have the third priority until the sum of all of allocated transmission power is smaller than or equal to the maximum transmission power configured in the UE.

17. The method of claim 16, wherein the proportionally reducing the transmission power of at least one of the one or multiple channels or signals that have the third priority comprises:

proportionally reducing transmission power of a service channel for transmitting data among the one or multiple channels or signals;

proportionally reducing transmission power of a control channel for transmitting control signaling among the one or multiple channels or signals, or transmitting at least one of the one or multiple channels or signals while stopping transmitting the other of the one or multiple channels or signals;

transmitting at least one of reference signals among the one or multiple channels or signals while stopping transmitting the other reference signals.

18. The method of claim 16, wherein the proportionally reducing the transmission power of each of the one or multiple channels or signals that have the third priority comprises:

in a sub-frame i, when the sum of transmission power required by channels or signals of all of serving cells configured for the UE is larger than the maximum transmission power configured in the UE, proportionally adjusting transmission power of channels or signals that have the same priority in serving cell c until the following condition is met:

$$\sum_c \sum_l (w_{c,l}(i) \cdot \hat{P}_{c,l}(i)) \le \left( \hat{P}_{CMAX}(i) - P_{allocated} \right)$$

wherein the $\hat{P}_{CMAX}(i)$ is a linear value of the maximum transmission power $P_{CMAX}(i)$ configured in the UE for sub-frame i;

$\hat{P}_{c,l}(i)$ is a linear value of power of a channel or signal l in serving cell c;

$w_{c,l}(i)$ is a power adjustment factor of the power of the channel or signal l in serving cell c, and $0 \le w_{c,l}(i) \le 1$;

$P_{allocated}$ is the power that has been allocated to channels or signals with priorities higher than the third priority;

$(\hat{P}_{CMAX}(i) = P_{allocated})$ is the remaining power after the power has been allocated to the channels or signals with priorities higher than the third priority.

19. The method of claim 7, wherein the allocating transmission power to a signal or channel of each of the serving cells according to the priority of the signal or channel comprises:
proportionally reducing transmission power of all channels or signals until the sum of all of allocated transmission power is smaller than or equal to the maximum transmission power configured in the UE;
in a sub-frame i, when the sum of transmission power required by channels or signals of all of the serving cells configured for the UE is larger than the maximum transmission power configured in the UE, proportionally adjusting, by the UE, transmission power of all of the channels or signals in a serving cell c until the following condition is met:

$$\Sigma\Sigma(w_{c,l}(i)\cdot \hat{P}_{c,l}(i))\leq(\hat{P}_{CMAX}(i))$$

wherein the $\hat{P}_{CMAX}(i)$ is a linear value of the maximum transmission power $P_{CMAX}$ configured in the UE for sub-frame i;
$\hat{P}_{c,l}(i)$ is a linear value of power of a channel or signal 1 in serving cell c;
$w_{c,l}(i)$ is a power adjustment factor of the power of the channel or signal 1 in serving cell c, $0\leq w_{c,l}(i)\leq 1$, and channels or signals having different priorities correspond to different $w_{c,l}(i)$.

20. The method of claim 2, wherein the step B comprises:
adjusting transmission power of a channel or signal according to one of Tables 2-7 when the sum of transmission power required by channels or signals of all of the serving cells configured for the UE is larger than the maximum transmission power configured in the UE:

TABLE 2

|  | SS | DS | CCH | DCH |
|---|---|---|---|---|
| PUCCH | 2, 3, 4 | 2, 3, 4 | 1, 2, 3, 4 | 1, 2, 4 |
| PUSCH | 2, 3 | 2, 3 | 1, 2, 3 | 1, 2 |
| PRACH | 3, 4 | 3, 4 | 1, 3, 4 | 1, 4 |
| SRS | 3, 4 | 3, 4 | 1, 3, 4 | 1, 4 |

TABLE 3

|  | SS | DS | PS CCH | PS DCH | PS CCH | PS DCH |
|---|---|---|---|---|---|---|
| PUCCH | 2, 3, 4 | 2, 3, 4 | 1, 2, 3, 4 | 1, 2, 4 | 1, 2, 3, 4 | 1, 2, 4 |
| PUSCH | 2, 3 | 2, 3 | 1, 2, 3 | 1, 2 | 1, 2, 3 | 1, 2 |
| PRACH | 3, 4 | 3, 4 | 1, 3, 4 | 1, 4 | 1, 3, 4 | 1, 4 |
| SRS | 3, 4 | 3, 4 | 1, 3, 4 | 1, 4 | 1, 3, 4 | 1, 4 |

TABLE 4

|  | PS SS | PS DS | N-PS SS | N-PS DS | PS CCH | PS DCH | PS CCH | PS DCH |
|---|---|---|---|---|---|---|---|---|
| PUCCH | 2, 3, 4 | 2, 3, 4 | 2, 3, 4 | 2, 3, 4 | 1, 2, 3, 4 | 1, 2, 4 | 1, 2, 3, 4 | 1, 2, 4 |
| PUSCH | 2, 3 | 2, 3 | 2, 3 | 2, 3 | 1, 2, 3 | 1, 2 | 1, 2, 3 | 1, 2 |
| PRACH | 3, 4 | 3, 4 | 3, 4 | 3, 4 | 1, 3, 4 | 1, 4 | 1, 3, 4 | 1, 4 |
| SRS | 3, 4 | 3, 4 | 3, 4 | 3, 4 | 1, 3, 4 | 1, 4 | 1, 3, 4 | 1, 4 |

TABLE 5

|  | SS | DS | Broadcast CCH | Broadcast DCH | Groupcast CCH | Groupcast DCH | Unicast CCH | Unicast DCH |
|---|---|---|---|---|---|---|---|---|
| PUCCH | 2, 3, 4 | 2, 3, 4 | 1, 2, 3, 4 | 1, 2, 4 | 1, 2, 3, 4 | 1, 2, 4 | 1, 2, 3, 4 | 1, 2, 4 |
| PUSCH | 2, 3 | 2, 3 | 1, 2, 3 | 1, 2 | 1, 2, 3 | 1, 2 | 1, 2, 3 | 1, 2 |
| PRACH | 3, 4 | 3, 4 | 1, 3, 4 | 1, 4 | 1, 3, 4 | 1, 4 | 1, 3, 4 | 1, 4 |
| SRS | 3, 4 | 3, 4 | 1, 3, 4 | 1, 4 | 1, 3, 4 | 1, 4 | 1, 3, 4 | 1, 4 |

TABLE 6

|  | SS | DS | PS CCH | PS DCH | N-PS CCH | N-PS DCH |
|---|---|---|---|---|---|---|
| SS | 3, 4 |  |  |  |  |  |
| DS | 3, 4 | 3, 4 |  |  |  |  |
| PS CCH | 2, 3, 4 | 2, 3, 4 | 1, 2, 3, 4 |  |  |  |
| PS DCH | 2, 3 | 2, 3 | 1, 2, 3 | 1, 2 |  |  |
| N-PS CCH | 2, 3, 4 | 2, 3, 4 | 1, 2, 3, 4 | 1, 2, 4 | 1, 2, 3, 4 |  |
| N-PS DCH | 2, 3 | 2, 3 | 1, 2, 3 | 1, 2 | 1, 2, 3 | 1, 2 |

TABLE 7

| | SS' | DS' | Broadcast CCH' | Broadcast DCH' | Groupcast CCH' | Groupcast DCH' | Unicast CCH' | Unicast DCH' |
|---|---|---|---|---|---|---|---|---|
| SS' | 3, 4' | | | | | | | |
| DS' | 3, 4' | 3, 4' | | | | | | |
| Broadcast CCH' | 2, 3, 4' | 2, 3, 4' | 1, 2, 3, 4' | | | | | |
| Broadcast DCH' | 2, 3' | 2, 3' | 1, 2, 3' | 1, 2' | | | | |
| Groupcast CCH' | 2, 3, 4' | 2, 3, 4' | 1, 2, 3, 4' | 1, 2, 4' | 1, 2, 3, 4' | | | |
| Groupcast DCH' | 2, 3' | 2, 3' | 1, 2, 3' | 1, 2' | 1, 2, 3' | 1, 2' | | |
| Unicast CCH' | 2, 3, 4' | 2, 3, 4' | 1, 2, 3, 4' | 1, 2, 4' | 1, 2, 3, 4' | 1, 2, 4' | 1, 2, 3, 4' | |
| Unicast DCH' | 2, 3' | 2, 3' | 1, 2, 3' | 1, 2' | 1, 2, 3' | 1, 2' | 1, 2, 3' | 1, 2' | wherein, "1" indicates adjusting transmission power of a channel or signal in a column where "1" is located until the total transmission power of an overlapping area is smaller than or equal to;

"2" indicates adjusting transmission power of a channel or signal in a column where "2" is located until the total transmission power of an overlapping area is smaller than or equal to;

"3" indicates stopping transmission of a channel or signal in a column where "3" is located;

"4" indicates stopping transmission of a channel or signal in a row where "4" is located; and "1,2,3" indicates two channels or signals corresponding to a row and a column where "1,2,3" is located can adopt a method corresponding to one of "1", "2" and "3".

21. A user equipment (UE) for power control in a system configured with serving cells, comprising: a power calculating module, a power allocating module and a transmitting module; wherein the power calculating module is configured to calculate transmission power required by each of serving cells configured for the UE respectively, wherein at least one of the serving cells is configured with device to device (D2D) sub-frames;

the power allocating module is configured to determine a channel or a signal that is possible to be transmitted in each of the serving cells and allocate transmission power for each channel or signal determined according to conditions of the serving cells configured for the UE, a relation between an amount of the total transmission power required by all of the serving cells, and an amount of maximum transmission power configured in the UE; and the transmitting module is configured to transmit the channel or signal of a serving cell according to the transmission power allocated to the channel or signal of the serving cell, wherein the power allocating module is further configured to allocate the transmission power for the channel or signal according to a priority for allocating transmission power of the channel or signal of each of the serving cells, and wherein the priority is determined based on whether the channel or signal is related to D2D service, cellular network communication service, public safety (PS) service, or non-public safety (N-PS) service.

* * * * *